(12) United States Patent
Forte

(10) Patent No.: US 10,614,535 B2
(45) Date of Patent: Apr. 7, 2020

(54) METHOD AND APPARATUS FOR CONTROLLING DIGITAL EVIDENCE

(71) Applicant: Dario V. Forte, Torre de' Picenardi (IT)

(72) Inventor: Dario V. Forte, Torre de' Picenardi (IT)

(73) Assignee: DFLabs S.p.A., Milan (IT)

( * ) Notice: Subject to any disclaimer, the term of this patent is extended or adjusted under 35 U.S.C. 154(b) by 1006 days.

(21) Appl. No.: 14/479,262

(22) Filed: Sep. 5, 2014

(65) Prior Publication Data
US 2015/0066785 A1 Mar. 5, 2015

Related U.S. Application Data

(63) Continuation of application No. 11/784,794, filed on Apr. 10, 2007, now abandoned.

(60) Provisional application No. 60/852,859, filed on Oct. 19, 2006.

(51) Int. Cl.
*G06Q 50/18* (2012.01)
*H04L 29/06* (2006.01)
*G06F 21/62* (2013.01)

(52) U.S. Cl.
CPC ........ *G06Q 50/18* (2013.01); *G06F 21/6218* (2013.01); *H04L 63/12* (2013.01)

(58) Field of Classification Search
CPC ..................................................... G06Q 10/10
See application file for complete search history.

(56) References Cited

U.S. PATENT DOCUMENTS

| | | | |
|---|---|---|---|
| 6,948,066 B2 | 9/2005 | Hind et al. | 713/168 |
| 7,134,020 B2 | 11/2006 | Eagle et al. | 713/176 |
| 7,181,560 B1 | 2/2007 | Grand et al. | 710/300 |
| 7,509,683 B2 | 3/2009 | Decime | 726/26 |
| 2004/0260876 A1 | 12/2004 | Singh et al. | 711/117 |

OTHER PUBLICATIONS

Cryptographic Hash (Year: 2005).*

* cited by examiner

*Primary Examiner* — Aryan E Weisenfeld
(74) *Attorney, Agent, or Firm* — Browdy and Neimark, P.L.L.C.

(57) ABSTRACT

A method and apparatus for controlling digital evidence comprising creating a case record comprising information about an investigative case, electronically storing at least one piece of digital evidence into memory, and associating the stored at least one piece of evidence with the case record.

14 Claims, 35 Drawing Sheets

| | | |
|---|---|---|
| LOCK | DATE/TIME | OPERATOR | EVENT | INFO |
| 🔒 | 09/02/2007 10:56:58 | 002 - VERDI LUCA | ADDED NEW CLONE OF LOG_3. | |
| 🔒 | 09/02/2007 10:55:59 | 002 - VERDI LUCA | ADDED NEW CLONE OF HD_8. | |
| 🔒 | 09/02/2007 10:53:28 | 002 - VERDI LUCA | INIZIO CLONAZIONE LOG. | |
| 🔒 | 09/02/2007 10:52:27 | 002 - VERDI LUCA | HOST SPH_1 DELETED. | |
| 🔒 | 09/02/2007 10:52:20 | 002 - VERDI LUCA | ADDED NEW HOST SPH_4. | |
| 🔒 | 09/02/2007 10:51:15 | 002 - VERDI LUCA | ADDED NEW MEDIA HD_8. | |
| 🔒 | 09/02/2007 10:49:22 | 002 - VERDI LUCA | ADDED NEW MEDIA MC_7. | |
| 🔒 | 09/02/2007 10:48:28 | 001 - ROSSI MARIO | ADDED NEW MEDIA HD_6. | |
| 🔒 | 09/02/2007 10:46:30 | 002 - VERDI LUCA | ADDED NEW FILE FOLDER EVIDENCE FF_5. | |
| 🔒 | 09/02/2007 10:45:24 | 002 - VERDI LUCA | ADDED NEW NETWORKDUMP NET_4. | |
| 🔒 | 09/02/2007 10:44:44 | 002 - VERDI LUCA | ADDED NEW LOG EVIDENCE LOG_3. | |
| 🔒 | 09/02/2007 10:43:18 | 001 - ROSSI MARIO | ADDED NEW MEDIA HD_2. | |
| 🔒 | 09/02/2007 10:34:35 | 001 - ROSSI MARIO | ADDED NEW MEDIA USB_1. | |
| 🔒 | 09/02/2007 10:33:02 | 001 - ROSSI MARIO | RECUPERO CHIAVETTA USB. | |
| 🔒 | 09/02/2007 10:32:39 | 002 - VERDI LUCA | ADDED NEW MEDIA CDVD_0. | |
| 🔒 | 09/02/2007 10:31:22 | 001 - ROSSI MARIO | ADDED NEW EVIDENCE COLLECTOR EVC_3. | |
| 🔒 | 09/02/2007 10:24:41 | 002 - VERDI LUCA | ADDED NEW HOST SRV_2. | |
| 🔒 | 09/02/2007 10:23:13 | 001 - ROSSI MARIO | ADDED NEW HOST WK_1. | |
| 🔒 | 09/02/2007 10:20:51 | 002 - VERDI LUCA | ADDED NEW HOST LAP_0. | |
| 🔒 | 09/02/2007 10:18:29 | 001 - ROSSI MARIO | CREATED NEW CASE XYZ. | |

09/02/2007 11:23:38 - Start D.I.M. (Digital Investigation Manager) V. 1.0
09/02/2007 11:23:38 -
09/02/2007 11:23:38 - Dim license: ENTERPRISE.
09/02/2007 11:23:39 - Connection Setting...loaded
09/02/2007 11:23:39 - Currency: AED - United Arab Emirates, Dirhams.
09/02/2007 11:23:39 - Logo not found.
09/02/2007 11:23:39 - Copy photo path: C:\Documents and Settings\Thomas\Desktop\DEMO rai\
09/02/2007 11:23:39 - Enable photo copy: true.
09/02/2007 11:23:39 - Enable footer print: true.
09/02/2007 11:23:39 - Header contnets: D.I.M. Digital Investigation Manager v. 1.0.
09/02/2007 11:23:39 - Remember to backup your database file: true.
09/02/2007 11:23:39 - Setting...loaded
09/02/2007 11:23:44 - Dim database connection: C:\Documents and Settings\Thomas\Desktop\DEMO RAI\DimDatabase.ddb.
09/02/2007 11:23:53 - Closed DFLabs - D.I.M.
09/02/2007 11:23:53 - ──────── 3302

---CASE LOG

09/02/2007 10:18:29 - New Case XYZ Created.
09/02/2007 10:20:51 - New host LAP_0 added.
09/02/2007 110:23:13 - New host WK_1 added.
09/02/2007 10:24:41 - New host SRV_2 added.
09/02/2007 10:25:26 - Host LAP_0 updated.
09/02/2007 10:26:06 - New photo DCP_1736.JPG to host WK_1 added.
09/02/2007 10:27:27:26 - Host WK_1 updated.
09/02/2007 10:27:40 - Host WK_1 updated.
09/02/2007 10:28:11 - New photo DSCN0699.JPG to host LAP_0 added.
09/02/2007 10:28:11 - New photo DSCN0700.JPG to host LAP_0 added.
09/02/2007 10:31:22 - New evidence collector EVC_3 added.
09/02/2007 10:32:39 - New media CDVD_0 added. 3304

FIG. 33A

09/02/2007 10:34:35 - New media USB_1 added.
09/02/2007 10:43:18 - New media HD_2 added.
09/02/2007 10:44:44 - New log LOG_3 added.
09/02/2007 10:45:24 - New networkdump NET_4 added.
09/02/2007 10:46:30 - New file/folder evidence FF_5 added.
09/02/2007 10:48:26 - New media HD_6 added.
09/02/2007 10:49:22 - New media MC_7 added.
09/02/2007 10:51:15 - New media HD_8 added.
09/02/2007 10:52:27 - Host SPH_4 Deleted.
09/02/2007 10:54:21 - New photo MobilePhoneVerdi.jpg to host SPH_4 added.
09/02/2007 10:55:27 - New MSD MSD_HD_0 to case 1 added.
09/02/2007 10:55:59 - New clone of HD_8 added.
09/02/2007 10:56:58 - New clone of LOG_3 added.
09/02/2007 10:57:09 - Clone of CLN_1 updated.
09/02/2007 11:00:31 - New Event 09/02/2007, Verdi Luca Inizio Clonazione Log Added To Timeline.
09/02/2007 11:01:16 - New Event 09/02/2007, Rossi Mario Recupero Chiavetta USB Added To Timeline.
09/02/2007 11:02:15 - New Event 09/02/2007 - Resp. Lab. Shannon > 002 - Verdi Luca To Chain Of Custody Added.
09/02/2007 11:02:44 - New Event 09/02/2007 - Resp. Lab. Shannon > 001 - Rossi Mario To Chain Of Custody Added.
09/02/2007 11:03:16 - New Event 09/02/2007 - Resp. Lab. Shannon > 002 - Verdi Luca To Chain Of Custody Added.
09/02/2007 11:03:55 - New Event 09/02/2007 - Operatore > 002 - Verdi Luca To Chain Of Custody Added.
09/02/2007 11:07:44 - New deliverable with attachment C:\Documents and Settings\Thomas\Desktop\DEMO RA\report2.rtf related to USB_1 added.
09/02/2007 11:08:19 - Expidenture Incurred In Date 09/02/2007 Amount 35.00 EUR - Euro Member Countries, Euro Added.
09/02/2007 11:09:06 - Hours in Date 09/2007 Amount 2 h: 0 m Added.
09/02/2007 11:09:26 - Expidenture Incurred In Date 09/02/2007 Amount 12.00 EUR - Euro Member Countries, Euro Added.
09/02/2007 15:20:23 - New photo Dscn0721.JPG to host WK_1 added.
09/02/2007 15:40:59 - Log LOG_3 updated.
09/02/2007 15:48:30 - Case closed.

FIG. 33B

METHOD AND APPARATUS FOR CONTROLLING DIGITAL EVIDENCE

CROSS-REFERENCE TO RELATED APPLICATIONS

This application is a continuation of pending U.S. patent application Ser. No. 11/784,794, filed Apr. 10, 2007, the entire disclosure and drawings of which are hereby incorporated herein by reference, and claims benefit of U.S. provisional patent application Ser. No. 60/852,859, filed Oct. 19, 2006, which is herein incorporated by reference.

BACKGROUND OF THE INVENTION

Field of the Invention

Embodiments of the present invention generally relate to a method and apparatus for controlling evidence and, more particularly, a method and apparatus for storing, retrieving, maintaining, deleting and tracking the chain of custody of digital evidence.

Description of the Related Art

In today's legal system, evidence is an essential aspect of litigation. Evidence must be carefully accumulated, stored under state or federal rules, and tracked throughout its existence. For a document or an object to be useable as evidence in a court room, such document or object must comply with all the laws applicable to evidence retrieval, maintenance, and tracking. In other words, evidence must remain authentic and its chain of custody must be maintained.

From the point of its retrieval, evidence is handled or viewed by many individuals. For example, evidence is handled or viewed by investigators, police officers, attorneys, witnesses, or an evidence keeper. Such individuals may co-exist at the same location, in different buildings, even in different cities, states, or countries. Thus, with numerous people interacting with the evidence, it becomes challenging to maintain the authenticity and the chain of custody of evidence.

If authenticity or chain of custody of a piece of evidence is challenged, the court may disallow the use of such evidence in a court room. In some cases, such as criminal cases, the cost of improper space handling of evidence maybe someone's freedom or life.

The challenges of handling evidence are exacerbated when the evidence is digital evidence, i.e., information stored upon a disk drive, compact disk (CD), or other digital media. Such digital evidence, if not properly handled, can be easily corrupted or destroyed. Furthermore, due to the intangible nature of digital evidence, tracking the chain of custody of digital evidence is difficult.

Therefore, there is a need for a system that would allow individuals, in different locations to access evidence without interfering with the authenticity of evidence, while simultaneously, providing a simple process for maintaining the chain of custody of a piece of evidence.

SUMMARY OF THE INVENTION

The present invention is a method and apparatus for controlling digital evidence. The method and apparatus comprises creating a case record comprising information about an investigative case, electronically storing at least one piece of digital evidence into memory, and associating the stored at least one piece of evidence with the case record.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 12 is an illustration of an exemplary timeline interface screen of a digital evidence system;

FIG. 14 is an illustration of an exemplary chain of custody interface screen of a digital evidence system;

FIG. 16 is an illustration of an exemplary cost involved interface screen of a digital evidence system;

FIG. 27 is an illustration of an exemplary operator interfaces screen of a digital evidence system;

FIGS. 33A and 33B are an exemplary log file of a digital evidence system; and

DETAILED DESCRIPTION

Embodiments of the present invention are utilized to control digital evidence. A plurality of system operators may open and/or update "cases" involving one or more pieces of digital evidence. Digital evidence may reside upon any form of digital media, such as, disk drives, compact disks (CD), digital video disk (DVD), floppy disk, and the like. In accordance with one embodiment of the invention, the operator enters information uniquely identifying the evidence, captures an image (or clone) of the content of the digital media, and stores the image (or clone) in a database in association with the identifying information. Once the case is established, other evidence can be added to the database, access to the evidence is tracked, Chain of title is controlled, reports regarding the case and/or the evidence can be generated, and so on. In this manner, control over digital evidence is established and maintained.

Figure 1:
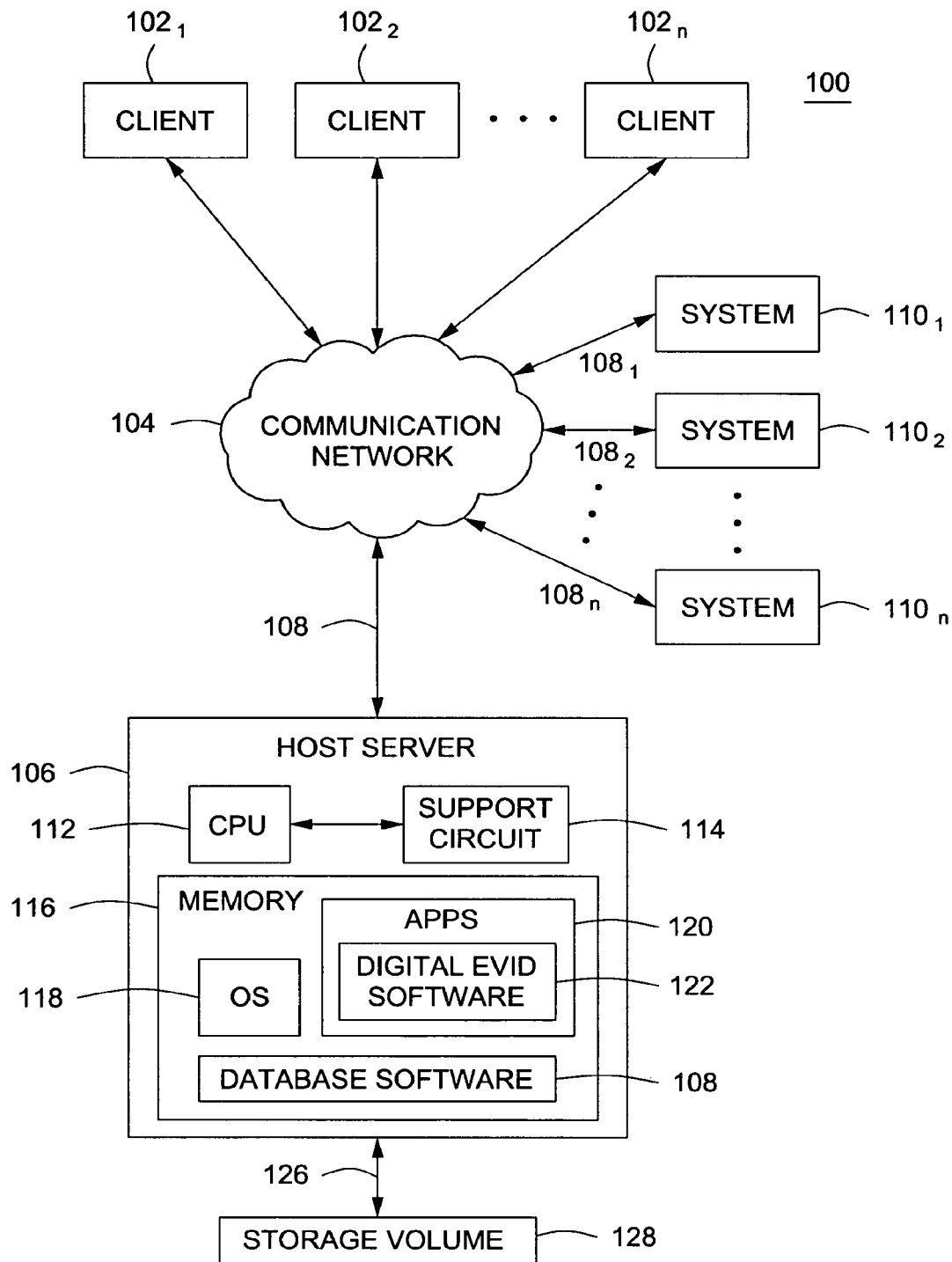
FIG. 1 is a schematic diagram of the hardware forming an exemplary embodiment of a computer system that operates in accordance with the present invention.

FIG. 1 is a schematic diagram of the hardware forming an exemplary embodiment of a computer system 100 that operates in accordance with the present invention. This figure only portrays one variation of the myriad of possible network configurations. The present invention can function in a variety of computing environments; such as, a distributed computer system, a centralized computer system, a stand alone computer system, or the like. One skilled in the art will appreciate that computing system 100 may or may not contain all the components listed below.

The computer system 100 comprises a plurality of client computers $102_1, 102_2 \ldots 102_n$, which may connect to one another through a conventional data communications network 104. A host server 106 is coupled to the communication network 104 to supply application and data services as well as other resource services to the clients $102_1, 102_2 \ldots 102_n$. The computer system 100 is coupled to host server 106 via communication link $108_1$. Similarly, systems $110_1$, $110_2 \ldots 110_n$ are coupled to the communication network 104 via communication links $108_1, 108_2 \ldots 108_n$. The communication link $108_1, 108_2 \ldots 108_n$ may be a physical link, a wireless link, a combination there of, or the like. Systems $110_1, 110_2 \ldots 110_n$ may be another computer system, another communication network, a wireless device, or the like.

The host server 106 comprises at least one central processing unit (CPU) 112, support circuits 114, and memory 116. The CPU 112 may comprise one or more conventionally available microprocessors. The microprocessor may be an application specific integrated circuit (ASIC). The support circuits 114 are well known circuits used to promote functionality of the CPU 112. Such circuits include, but are not limited to, a cache, power supplies, clock circuits, input/output (I/O) circuits and the like. The memory 116 contained within the host server 106 may comprise random access memory, read only memory, removable disk memory, flash memory, and various combinations of these types of memory. The memory 116 is sometimes referred to main memory and may, in part, be used as cache memory or buffer memory. The memory 116 generally stores the operating system 118 of the host server 106. In addition, the memory 116 stores database software 108, various forms of application software 120, such as evidence control evidence software 122, and database software 124. The operating system may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like. The database software 124 may comprise a relational database, for example, SQL from Oracle Corporation.

The communications network 106 may be coupled to the input/output (I/O) ports 126 of the host server 106. The I/O ports 126 are coupled of the storage volume 128. The storage volume 128 generally comprises one or more disk drives, or disk drive arrays, that may be used as a mass storage device for the host server 106 or systems $110_1, 110_2 \ldots 110_n$. The storage volume 124 may support a plurality of host servers 106 (only one of which is depicted).

To support the operation and functionality of the present invention, the memory 116 may be partially used as cache memory to temporarily store cached information. The evidence control software may utilize the memory 116 for evidence control functions, such as, storing, viewing, editing, and the like.

Under normal operation, the host server 106 supports application programs 120, such as, the evidence control software 122. In one embodiment, the digital evidence control software 122 allows for digital evidence manipulation on the host server 106. In addition, the evidence control software 122 enables a plurality of client computers $102_1, 102_2 \ldots 102_n$, in different locations, to view evidence without tampering with it, while maintaining chain of custody and evidence authenticity. The evidence control system may allow for more than one mode of access, such as an administrator access mode and a user access mode. For example, an evidence control system administrator may be able to store, view, maintain, delete records of evidence, or control users' accounts. On the other hand, a user may be able to request an account, access such account, and view evidence designated to the specific user account.

It should be noted that an operator is a person utilizing the digital evidence control system. The digital evidence control system may allow for more than one mode of access with different operator functions, such as an administrator access mode and a user access mode. For example, a digital evidence control system administrator may be able to store, view, maintain, delete records of evidence, or control users' accounts. On the other hand, a user may be able to request an account, access such account, and view evidence designated to the specific user account. In one embodiment, the digital evidence control system may allow for one or more operators, administrators, and/or users, where each person has a different assigned role offering varied levels of access to the evidence database.

Figure 2:
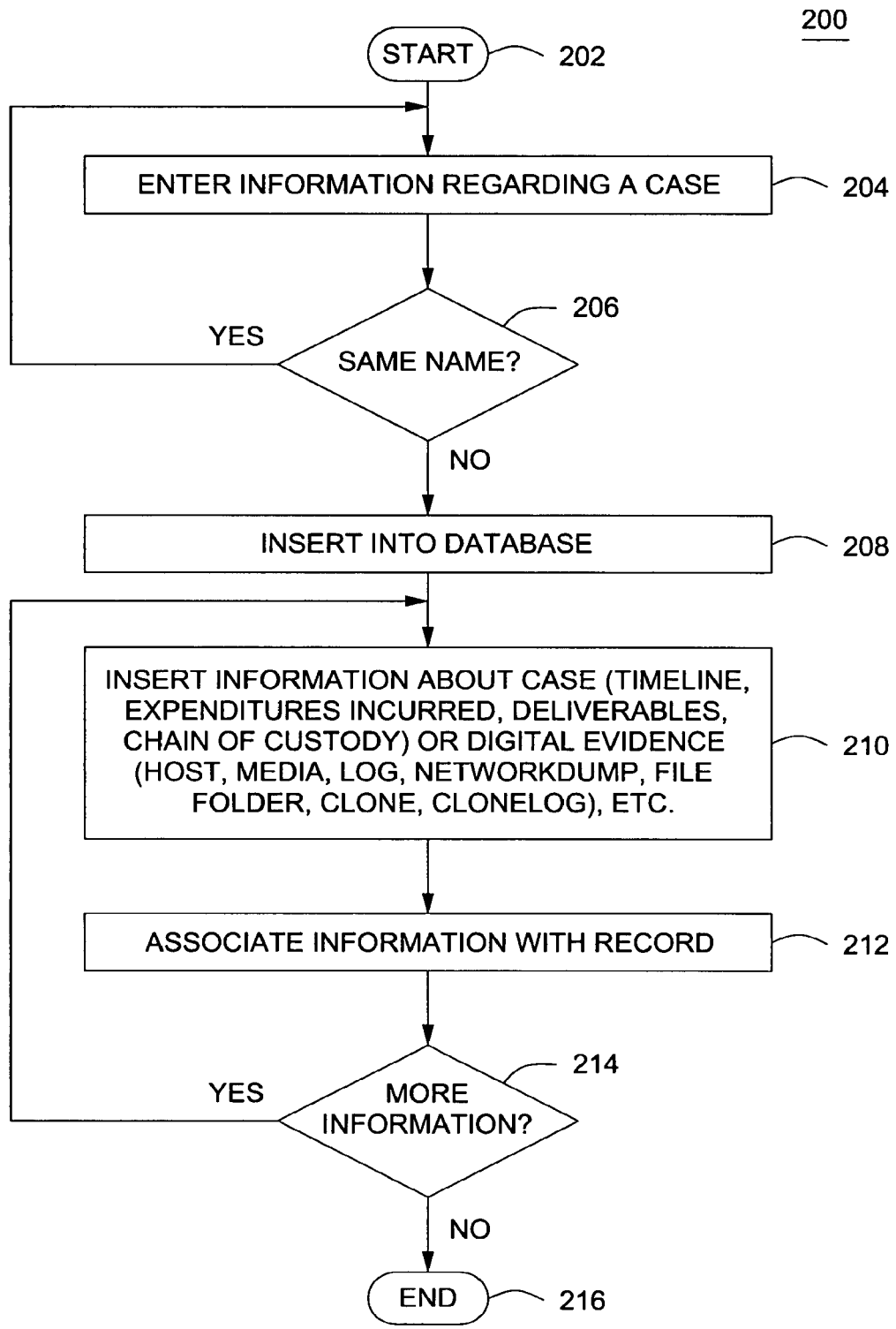
FIG. 2 is a flow diagram depicting an exemplary embodiment of a method for starting a new case in a digital evidence system.

FIG. 2 is a flow diagram depicting an exemplary embodiment of a method 200 for entering case information into a digital evidence system. The method 200 starts at step 202 and proceeds to step 204, wherein the operator, or in many cases an administrator enters information regarding a case. At step 206, the method determines a case already exists in the evidence system having the same name. If the case name already exists, the method 200 proceeds to step 204, wherein the operator or the administrator must change the case name. At step 208, the method 200 associates the information entered with the record. At step 210, the method 200 creates a record of digital evidence, including, for example, at least one of a TimeLine, expenditures incurred, deliverables, a chain of custody, a host, a media, a log, a network dump, a file/folder, a clone or a CloneLog, and the like. At step 212, the method 200 associates the information entered with the record. At step 214, the method queries whether there is more information to be entered. If the query is positively answered, the method 200 proceeds to step 210. Otherwise, the method 200 ends at step 212.

Figure 3:
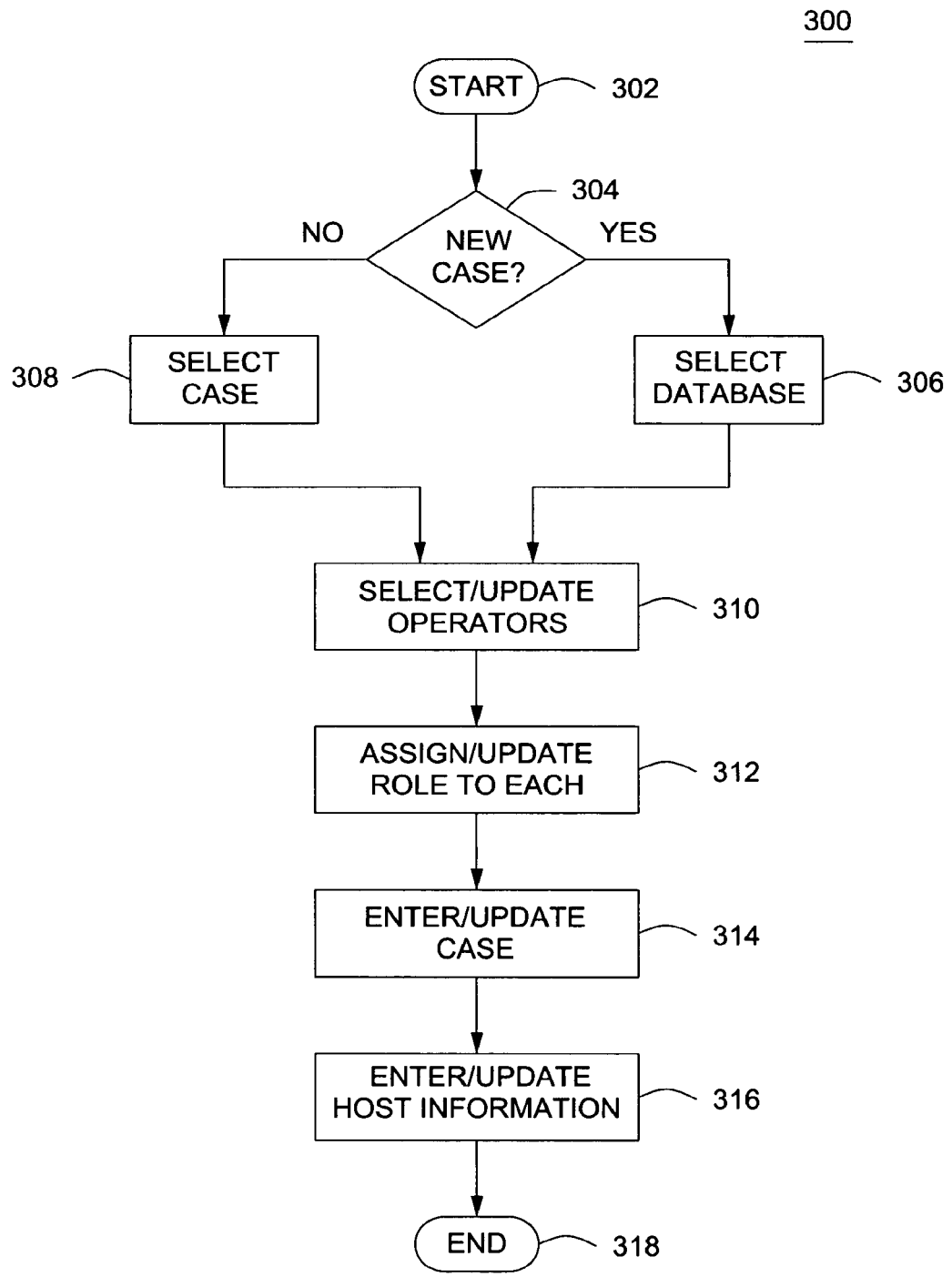
FIG. 3 is a flow diagram depicting an exemplary embodiment of a method for entering case information into a digital evidence system.

FIG. 3 is a flow diagram depicting an exemplary embodiment of a method 300 for entering case information into a digital evidence system. The method 300 starts at step 302 and proceeds to query step 304. If there is a new case, the method 300 proceeds from step 304 to step 306. At step 306, the method 300 selects a database to use for storing information related to the case. This may be a manual or automated selection process. If there is not a new case, the method 300 continues to the step 308. At step 308, the method 300 selects the relevant case. Both step 306 and 308 continue to step 310. At step 310, the method 300 selects or updates operators that are working in the case. Then, at step 312, the method 300 assigns or updates the role of each operator, i.e., the function does each operator perform in the operator process. The roles are used to define level of access the operator has to the system. At step 314, the method 300 enters or updates a case description. At step 316, the method 300 enters or updates host information. The method 300 ends at step 318.

Figure 4:
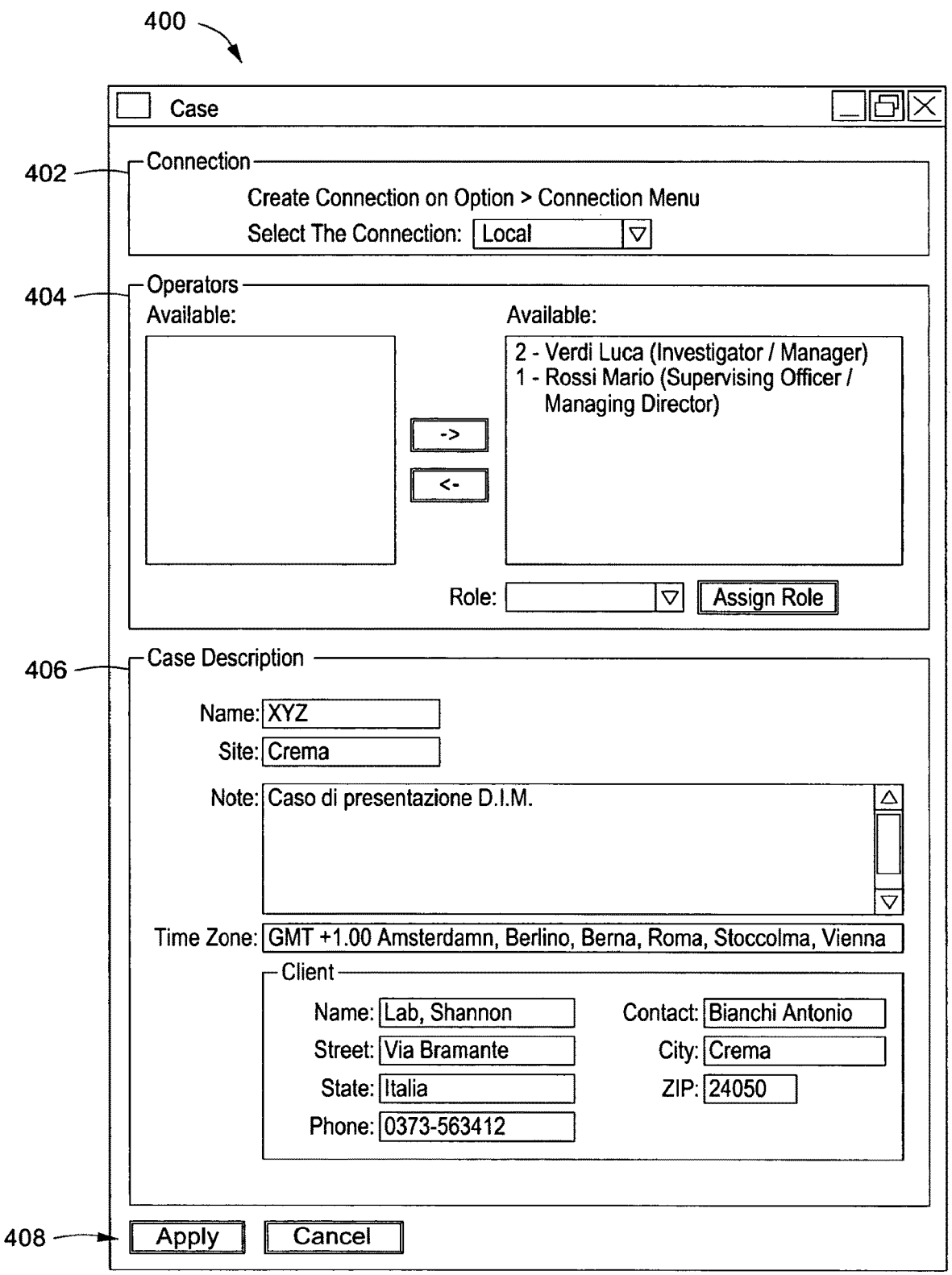
FIG. 4 is an illustration of an exemplary case information interface screen of a digital evidence system.

FIG. 4 is an illustration of an exemplary case information interface screen 400 of a digital evidence system. The case interface screen 400 may be used by an operator and/or an administrator to create a new case. The administrator enters a new case information into the fields in the new case window 400. The new case window 400 may have fields, such as but not limited to, database selection fields 402, investigators' information field 404, and case description fields 406. The case description fields include, but are not limited to, name of police officers, addresses (street, city, state, zip code), date time, and the like. After entering the information, the administrator saves and/or updates the information entered by selecting an "Update case" button 408.

Figure 5:
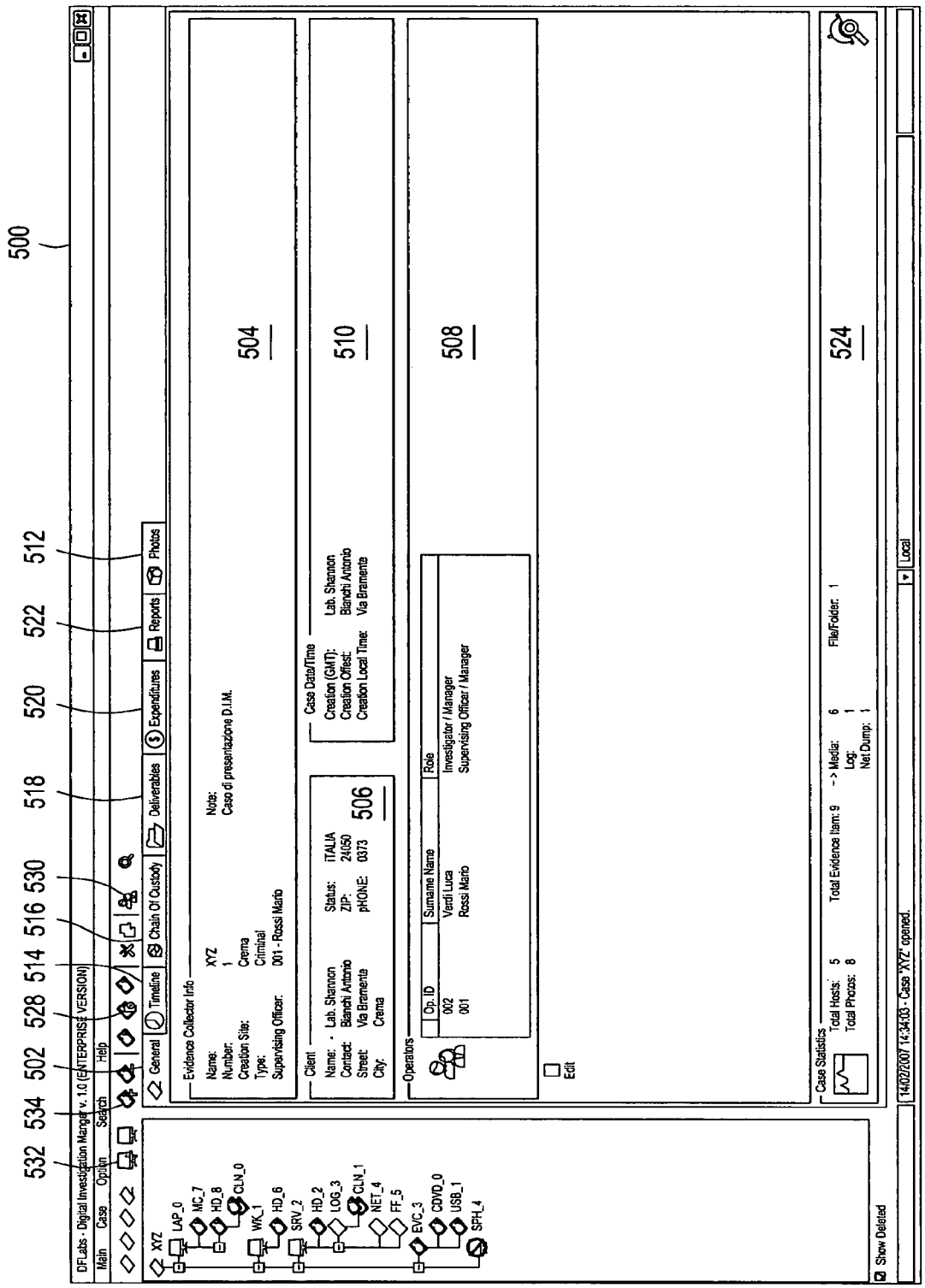
FIG. 5 is an illustration of an exemplary case information interface screen of a digital evidence system.

FIG. 5 is an illustration of an exemplary case information interface screen 500 of digital evidence. Once a case is created, case information can be displayed in connection with the general tab 502. The general interface screen 500 includes the case information windows 504, the client information windows 506, the operator information 508, and data information 510. The case information window 504 includes the case name, location, type, notes, and the like. The client information window 506 includes client's name, client's business name, street, city, state, zip and phone, and the like. The operator information window 508 includes operator's name, id, title and the like. Whereas the data information window 510 includes the data's type, date, and so on. The case interface screen 500 contains a plurality of tabs, such as, general tab 502, photo tab 512 hidden, timeline tab 514, chain of custody tab 516, deliverables 518, expenditures tab 520, and a report tab 522; the screen related to each tab is show in FIGS. 6, 8, 10, 14, 16, respectively. The case information interface screen 500 may also display case statistics information 524, such as, total hosts, total photos, and total evidence information.

Figure 6:
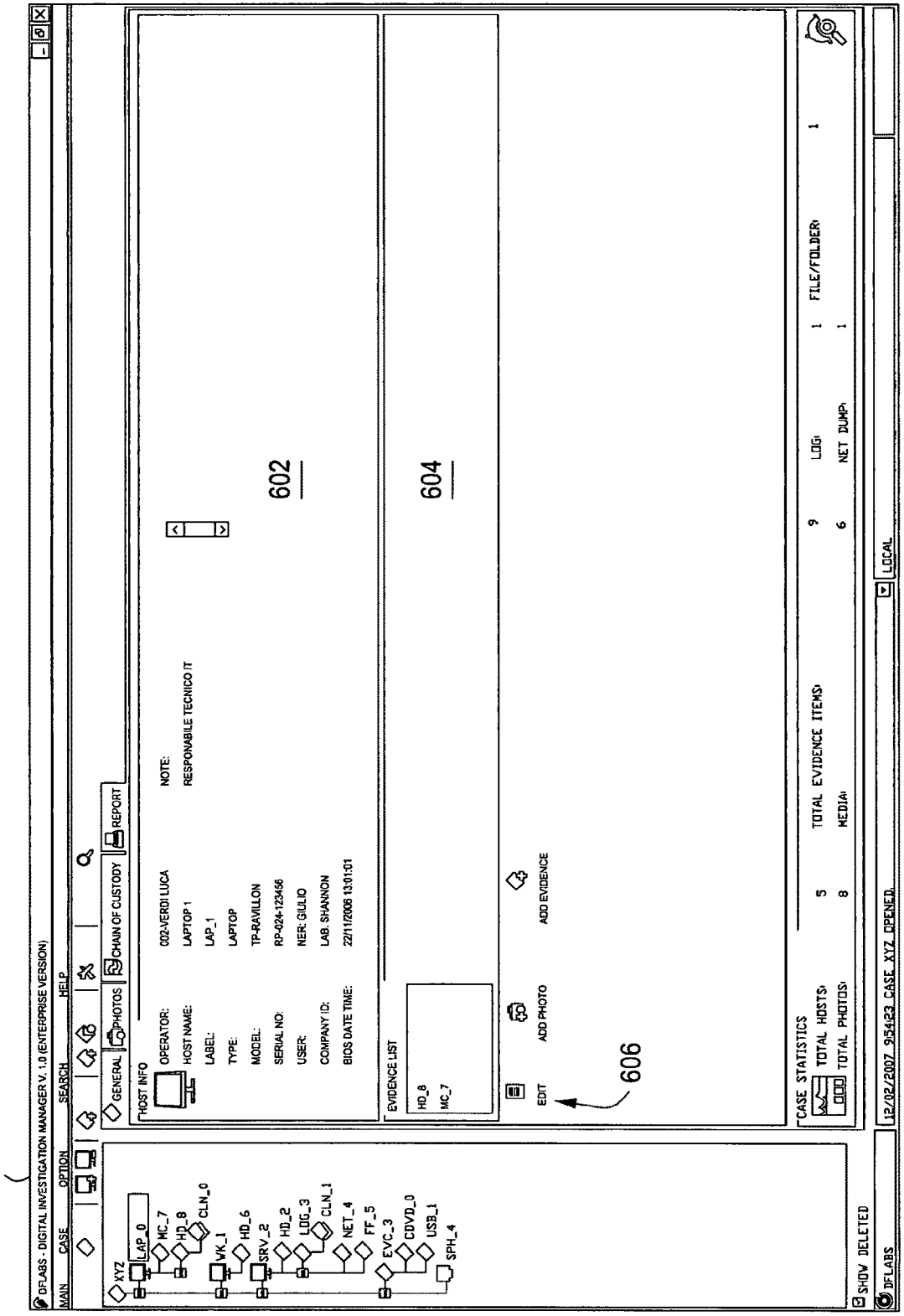
FIG. 6 is an illustration of an exemplary host interface screen of a digital evidence system.

FIG. 6 is an illustration of an exemplary host information interface screen 600 of digital evidence. Once a case is created and host is inserted, host information can be displayed in the host information interface screen 600. The host information interface 600 includes a host information window 602, and an evidence list window 604. The host information window 602 includes the host name, type of host, model, serial number, user, and the like. The evidence list window 604 includes the evidences that are been associated to the host selected. The host interface screen contains the same tabs shown in screen 500 but in this case the photo tab 512 is displayed and shows the host's photo and the chain of custody tab 516 shows the movements of the host. For editing host information the operator can select an edit button 606.

Figure 7:
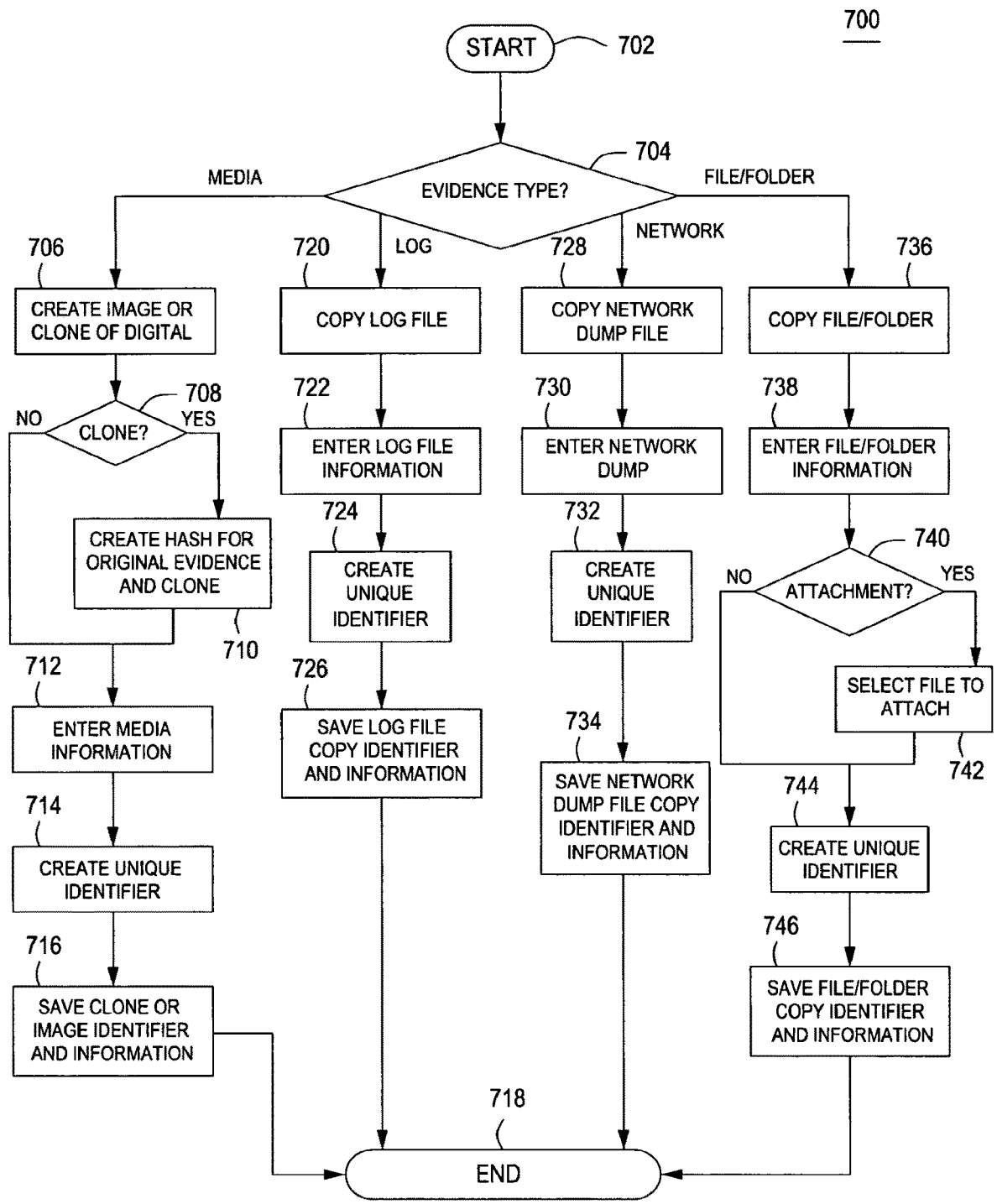
FIG. 7 is a flow diagram depicting an exemplary embodiment of a method for viewing case and evidence information of a digital evidence system.

FIG. 7 is a flow diagram depicting an exemplary embodiment of a method 700 for viewing case and evidence information if a digital evidence control system. The method 700 starts at step 702 and continues to step 704, wherein an operator selects an evidence type, i.e., selects media, log, network dump or file/folder. If the evidence type is media, then the method 700 proceeds to step 706. At step 706, the method 700 copies the digital content of the media in a file-by-file manner and stores the clone in memory. When an image is created, the method 700 creates a snapshot of the contents of the media and stores the image as a single file in memory. The method 700 creates a hash for original evidence and clone. The hash, for example, an MD5 hash, is used to ensure that the evidence is not tampered with or otherwise altered. Any change in the content of the clone would alter the hash. If the method 700 does not create a clone, the query at step 708 is negatively answered and the method 700 continues to step 712, in which an operator enters a media description. Then, at step 714, the method creates a unique identifier for the evidence such that the evidence is tagged for tracking purposes. At 716, the operator saves the clone or image identifier and information that the operator entered in previous step. Finally, at step 748, the method 700 ends.

On the other hand, if the evidence is contained in a log file type, then from step 704, the method 700 proceeds to step 720. At step 720, the method 700 copies the log file. At step 722 and 724 respectively, the method 700 enters log file description and creates a unique identifier for the log file entered as digital evidence. Then, at step 726, the operator saves the log copy identifier and information. Finally at step 748, the method ends.

If the evidence is contained in a network dump (i.e., a stream of data from a network feed), then the method 700 proceeds from step 704 to 728. At step 728, the method 700 copies the network dump as a single file onto the digital evidence system. At steps 730 and 732, respectively, the operator enters a network dump description and creates a unique identifier for tracking the evidence. Next, in step 734, the operator saves the network dump copy identifier and information. Finally, at step 748, the method 700 ends.

If the evidence is contained in a file/folder dump, then the method 700 proceeds from step 704 to 736. At step 736, the method 700 copies the file/folder in a folder onto the digital evidence system. At steps 738, the operator enters a file/folder description. The method 700 proceeds to query step 740. If there is a file to attach, the method 700 proceeds from step 740 to step 742, wherein the method 700 selects a file to attach to the file/folder evidence. The method 700 proceeds to step 744. At step 744, the operator creates a unique identifier for tracking the evidence. Next, in step 746, the operator saves the file/folder copy identifier and information. Finally, at step 748, the method 700 ends.

Figure 8:
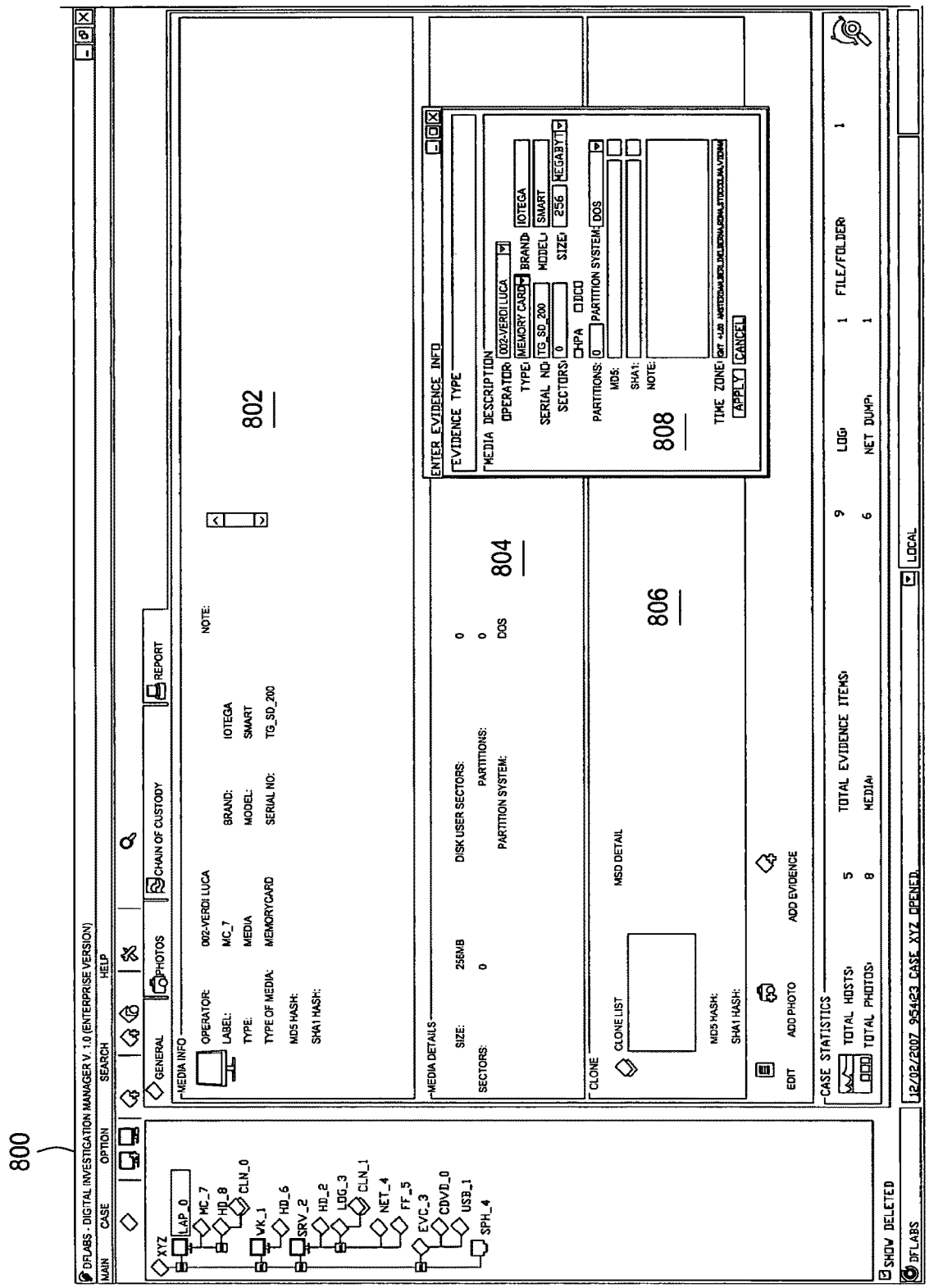
FIG. 8 is an illustration of an exemplary evidence information interface screen of a digital evidence system.

FIG. 8 is an illustration of an exemplary evidence information interface screen 800 of a digital evidence system. The evidence information interface screen 800 contains evidence information, such as, media information 802, media detail 804, and the clone list 806 that are associated to the media selected. The media information window 802 may include operator's name, evidence label and type, and the like. The media detail window 804 may contain media details, such as, media size, media sector, and the like. Such information may be available to a user. In one embodiment, the administrator enters evidence information in the enter evidence information interface screen 808. In various other embodiments, the assigned roles of the users, operators and administrators define the level of system access for each person. Thus, the assigned role may be defined by the persons that enter the evidence information.

Figure 9:
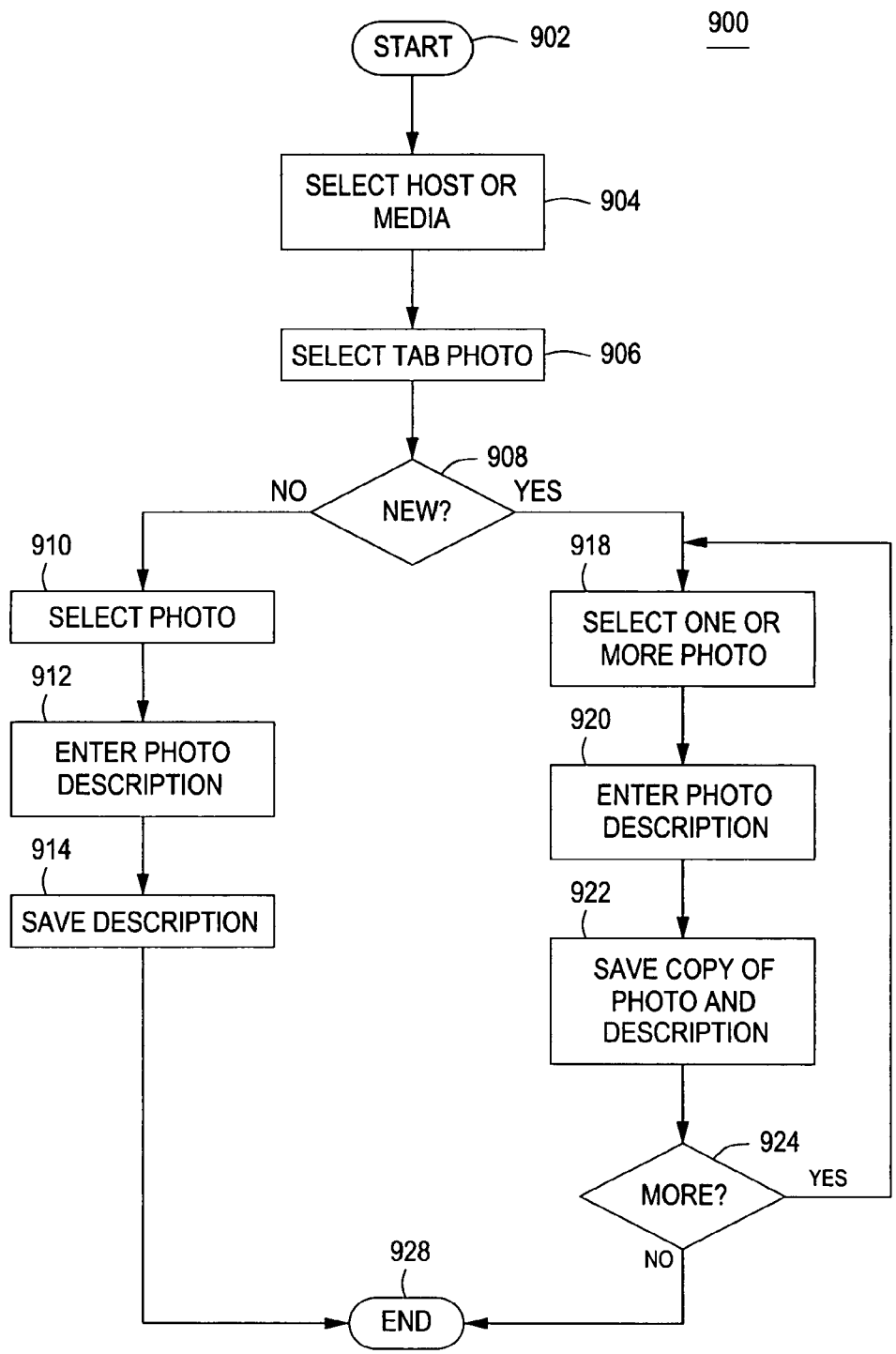
FIG. 9 is a flow diagram depicting an exemplary embodiment of a method for entering photo and/or photo information into a digital evidence system.

FIG. 9 is a flow diagram depicting an exemplary embodiment of a method 900 for entering a digital photograph and/or photograph description into a digital evidence system. The method 900 starts with step 902, when the operator select the host or media to which inserting photographs. At step 906, the operator selects the photos tab 512, which causes the photo screen interface (see FIG. 10) to display on a computer screen. The method 900 proceeds to the query at step 908. If the operator wants to edit any information about a photograph that is been stored into the digital evidence system, the method 900 proceeds from step 908 to step 910. At step 910, the operator selects the photograph that is to be edited. At step 914, the method 900 saves the new information and the method 900 ends at step 928. Instead, if the operator wants to insert new photographs, the method 900 proceeds to step 918. At step 918, the operator uploads at least one photograph. At step 920, a description of the uploaded photograph may be entered. Finally, at step 922, the operator saves the photograph and the description as a portion of the case. The method 900 proceeds to query at step 924, if the operator wants to insert a new photograph, the method 900 proceeds to step 918; otherwise, the method 900 ends at step 928.

Figure 10:
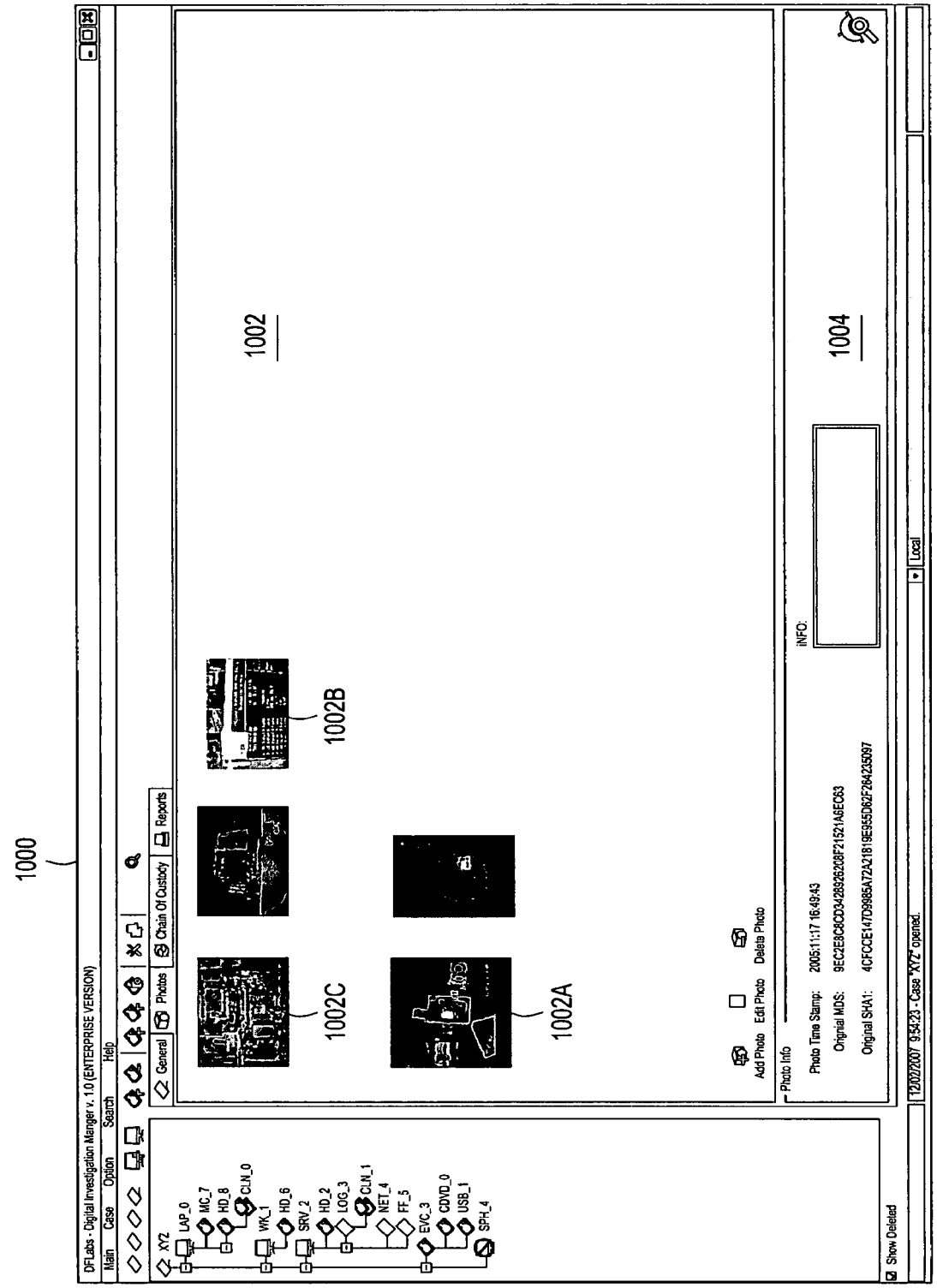
FIG. 10 is an illustration of an exemplary photo gallery interface screen of a digital evidence system.

FIG. 10 is an illustration of an exemplary photo gallery interface screen 1000 of a digital evidence system. Upon selecting the photos tab 512 (see FIG. 5), the invention displays a photo gallery interface screen 1000, as show in FIG. 10. The gallery interface screen 1000 may include one or more digital photographs 1002, which can be used as evidence, photographs of actual evidence, supporting documentation of evidence, a view of the environment in which the evidence was found, and the like. The photographs 1002 may include evidence photograph 1002*a*, photos/screen shot of database documentation 1002*b*, photograph 1002*c* of the location from which the evidence was extracted (computer system, a memory tower, etc.), and the like. The photo information section 1004 contains information, such as, the photo creation date and time, identification tags, descriptive text and the like.

Figure 11:
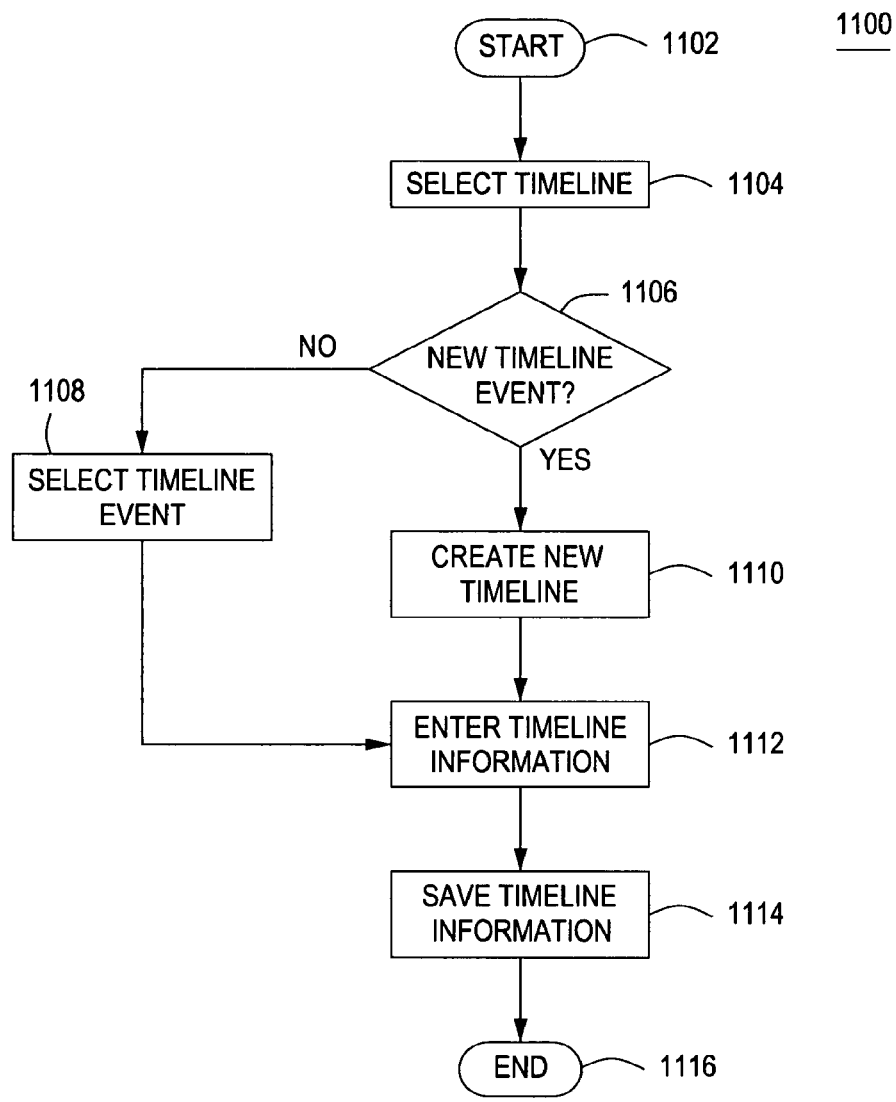
FIG. 11 is a flow diagram depicting an exemplary embodiment of a method for entering timeline and/or timeline information into a digital evidence system.

FIG. 11 is a flow diagram depicting an exemplary embodiment of a method 1100 for entering/updating timeline and/or timeline information into a digital evidence system in accordance with one or more embodiments of the invention. Upon the operator selecting timeline tab 514, (see FIG. 5), the method 1100 begins at step 1102, whereupon the timeline screen (see FIG. 12) display on a computer monitor. At step 1104, the operator selects the timeline tab. The method 1100 proceeds to the query at step 1106. If the operator wants to edit any information about a timeline event that has been stored into the digital evidence system, the method 1100 proceeds from step 1106 to step 1108. At step 1108, the operator selects the timeline event to edit. If the operator, instead, wants to insert a new timeline event, the method 1100 proceeds at step 1110. At step 1110, the operator creates a new timeline. From step 1108 and step 1110, the method 1100 proceeds to step 1112. At step 1112, the operator inserts the timeline information that delineate various task (events) performed during the investigations. At step 1114, the method 1100 saves timeline information. The method ends at the step 1116.

FIG. 12 is an illustration of an exemplary timeline interface screen 1200 of a digital evidence control system in accordance with one or more embodiments of the investigation. The timeline interface screen 1200 is displayed upon selecting the timeline tab 514 (see FIG. 5). The timeline interface screen 1200 comprises an event list area 1210 that includes the date and time of the event 1202, the operator's name 1204, and the event type 1206. The event and information pertaining thereto is entered in the event window 1208. When a particular event is selected, the event list area 1210, the information pertaining to the selected event appears in window 1208.

Figure 13:
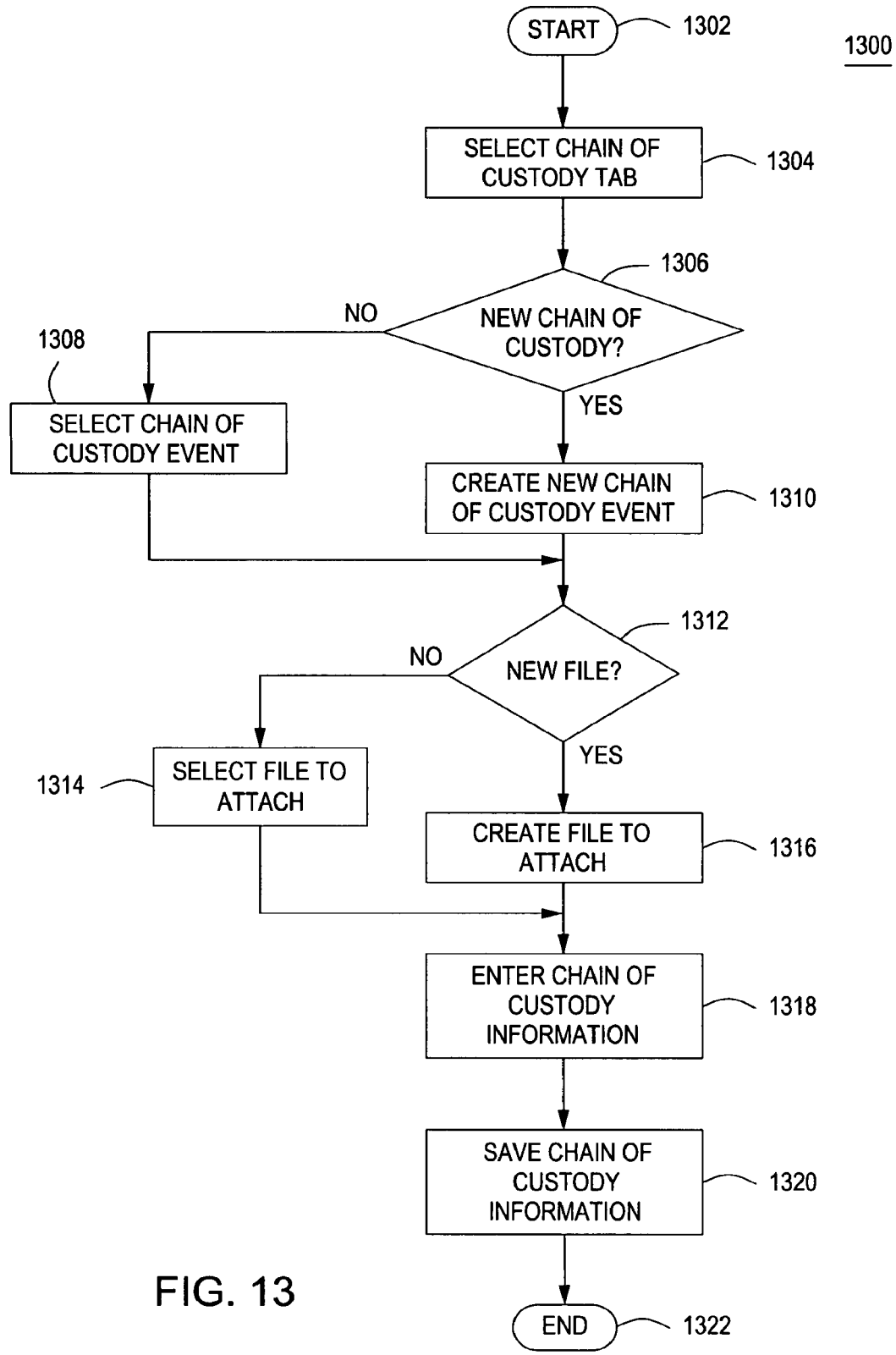
FIG. 13 is a flow diagram depicting an exemplary embodiment of a method for entering chain of custody and/or chain of custody information into a digital evidence system.

FIG. 13 is a flow diagram depicting an exemplary embodiment of a method 1300 for entering/updating a chain of custody event related to particular evidence into a digital evidence system in accordance with one or more embodiments of the invention. The method 1300 starts with step 1302, upon which the operator selecting the chain of custody tab 516 (see FIG. 5). Then, the method 1300 proceeds to a query at step 1306. If the operator wants to edit any information about a chain of custody event that has been stored into the digital evidence system, the method 1300 proceeds from step 1306 to step 1308. At step 1308, the operator selects the chain of custody event to edit. If the operator, instead, wants to insert a new chain of custody event, the method 1300 proceeds at step 1310. At step 1310, the operator creates a new chain of custody event. From step 1308 and step 1310, the method 1300 proceeds to step 1312. At step 1312, if the operator wants to add a new file related to chain of custody event, the method 1300 proceeds to step 1316, wherein the operator creates a file related to chain of custody. If the operator wants to select an existing file related to the chain of custody, the method 1300 proceeds to step 1314, wherein the operator selects a file to attach. From step 1314 and step 1316, the method 1300 proceeds to step 1318. At step 1318, the operator inserts the chain of custody information that delineates the movements performed during the investigations by the evidence. At step 1320, the method 1300 saves chain of custody information. The method 1300 ends at the step 1322.

Figure 14:
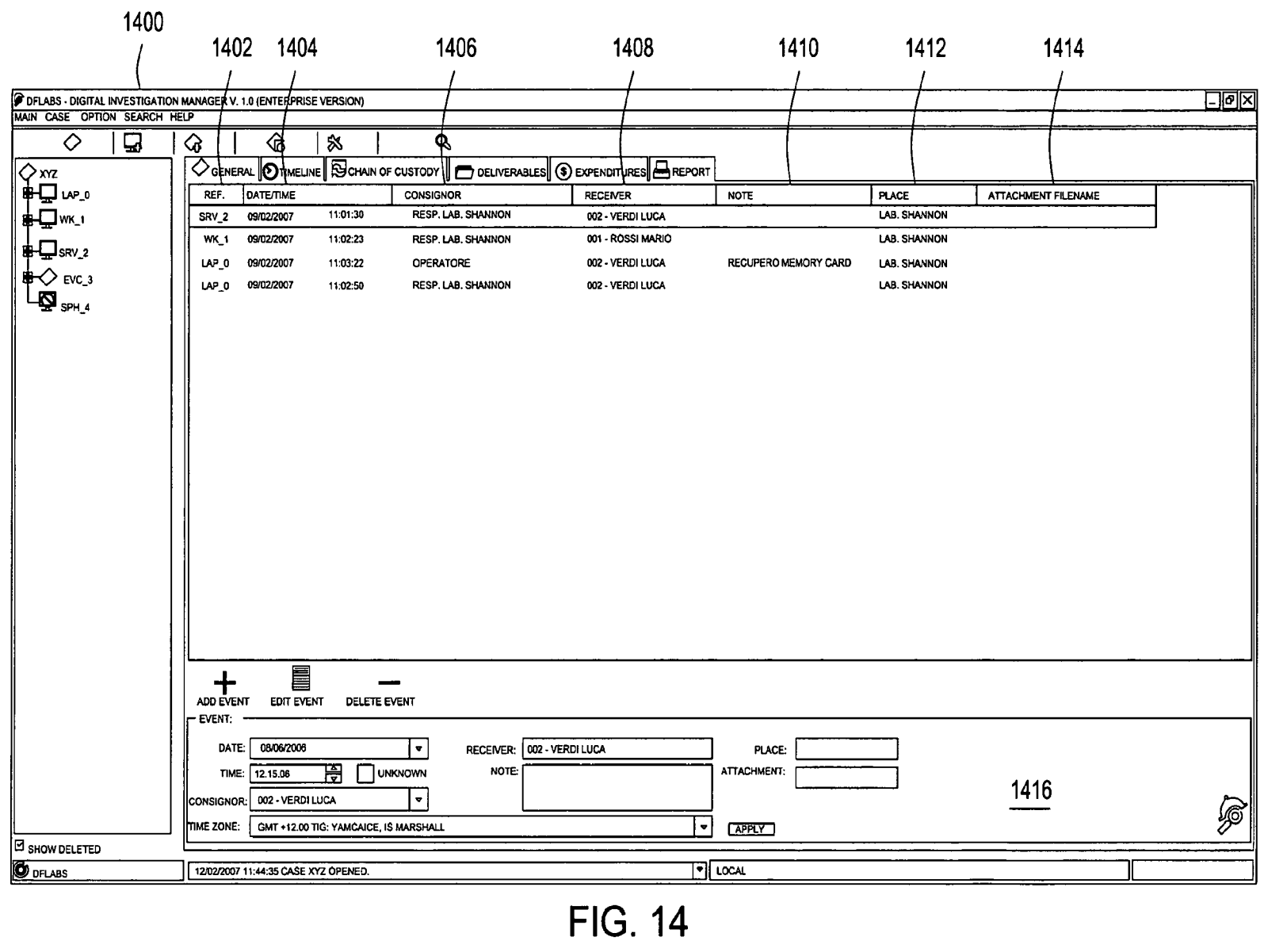

FIG. 14 is an illustration of an exemplary chain of custody interface 1400 of a digital evidence control system. FIG. 14 shows the chain of custody interface screen 1400 is displayed upon the operator selecting the chain of custody tab 516. The chain of custody interface screen 1400 includes evidence data, such as, host whom has been associated 1402, date time information 1404, consignor information 1406, receiver information 1408, note information 1410, place information 1412 and attachment filename information 1414. The information defines who provided the evidence, who received the evidence and what evidence was used after being received. In addition, a new event section 1416 is available for an administrator to enter chain of custody information.

Figure 15:
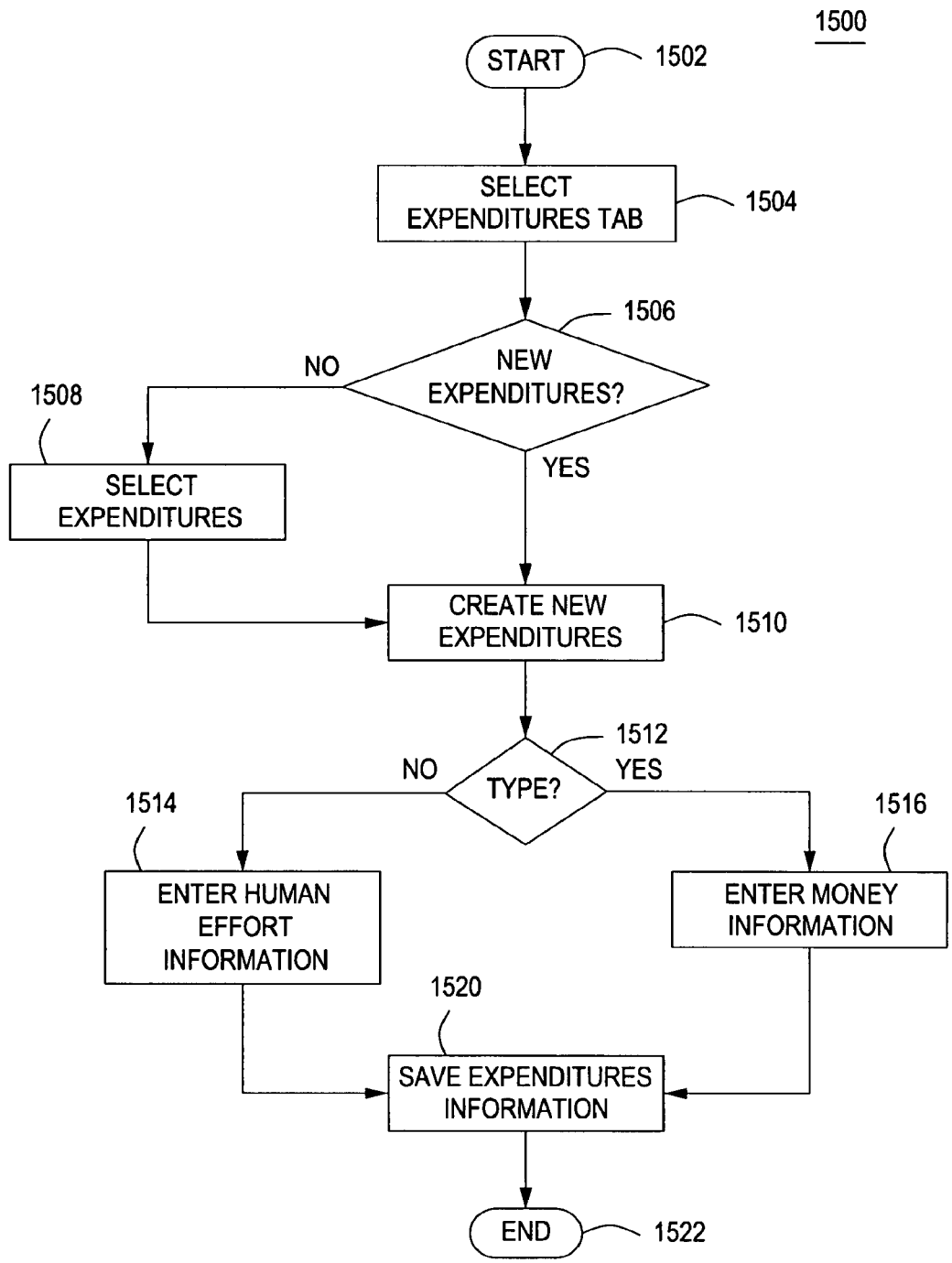
FIG. 15 is a flow diagram depicting an exemplary embodiment of a method for entering cost and/or cost information into a digital evidence system.

FIG. 15 is a flow diagram depicting an exemplary embodiment of a method 1500 for entering information pertaining to expenditures in the case into a digital evidence system in accordance with one or more embodiments of the invention. The method 1500 starts at step 1502, upon an operator selecting the expenditures tab 520 at step 1504 (see FIG. 5). Then, the method 1500 proceeds to query at step 1506. If the operator wants to edit any information about an expenditure that has been stored into the digital evidence system, the method 1500 proceeds from step 1506 to step 1508. At step 1508, the operator selects the expenditure to edit. If the operator, instead, wants to insert a new expenditure, the method 1500 proceeds to step 1510. Next, the method 1500 proceeds to query at step 1512, wherein the operator chooses the type of expenditure. If the operator wants to add human effort expenditure the method 1500 proceeds to step 1514 and the operator inserts the information about the hours. Instead, if the operator wants to insert a monetary expenditure the method 1500 proceeds to step 1516 and the operator adds money information about the expenditure. At step 1520, the method 1500 saves expenditure information. The method ends at step 1522.

Figure 16:
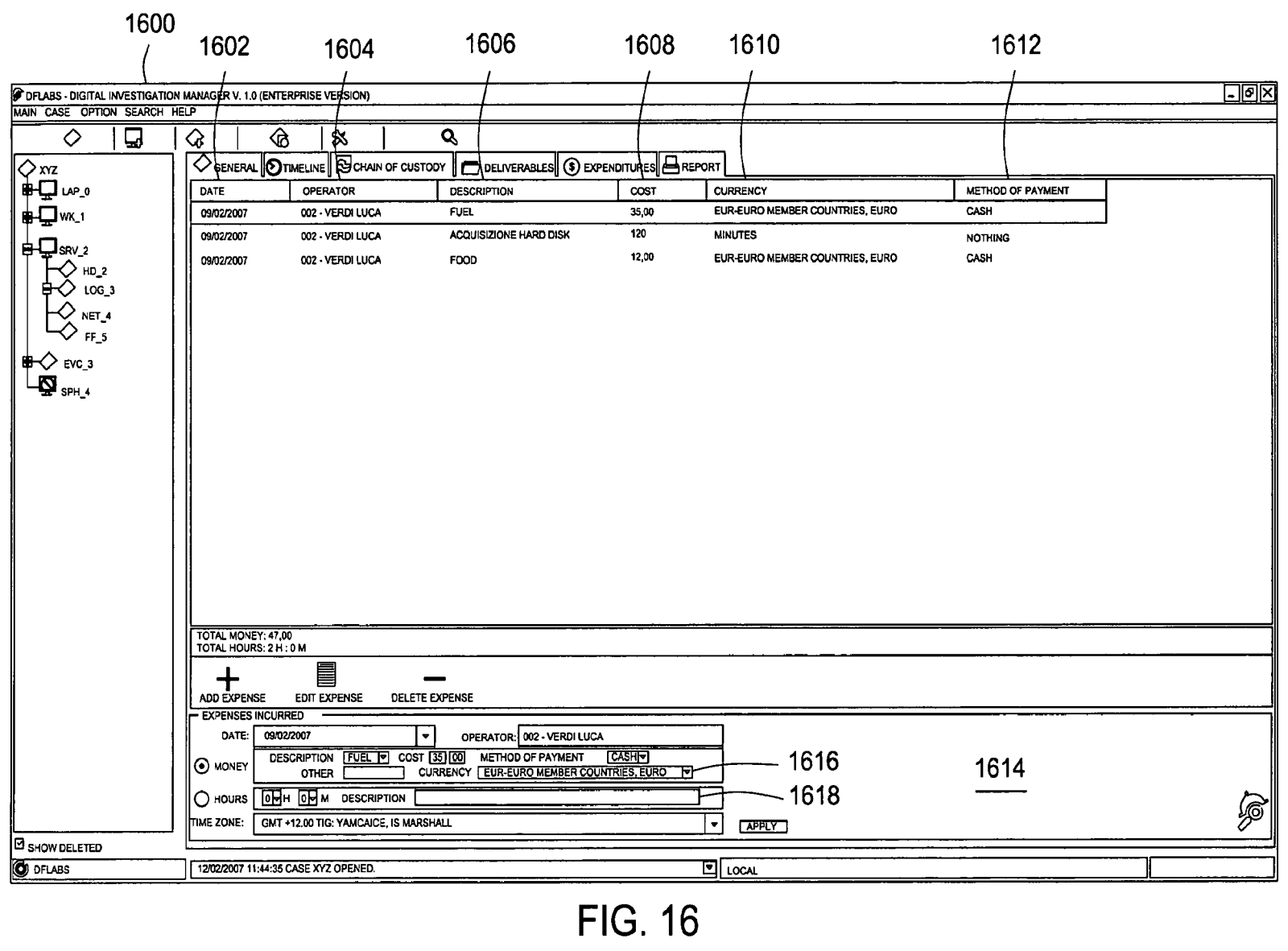

FIG. 16 is an illustration of an exemplary expenditures interface screen 1600 of a digital evidence system in accordance with one or more embodiments of the invention. Upon an operator selecting the expenditures tab 520 (see FIG. 5), the invention displays the expenditures interface screen 1600. The expenditures interface screen 1600 includes activity information, such as activity data field 1602, investigator's name field 1604, a description field 1606, a cost/hour field 1608, a currency field 1610 and a method of payment field 1612. This information provides a cumulative record of the expenditures to acquire and handle evidence in particular case. The expenditures are classified into two categories: money expenditures and human effort. In addition, the expenditures interface screen 1600 include a expenditures section 1614 that are divided into two section, the first 1616 where are shown money expenditures and the second 1618 where are shown the human effort expenditures; on other hand, a user may be able to only view the expenditures information. Some roles may be defined to block any view of the expenditures of a case, or only the investigators personal expenditures may be displayed to a particular investigator.

Figure 17:
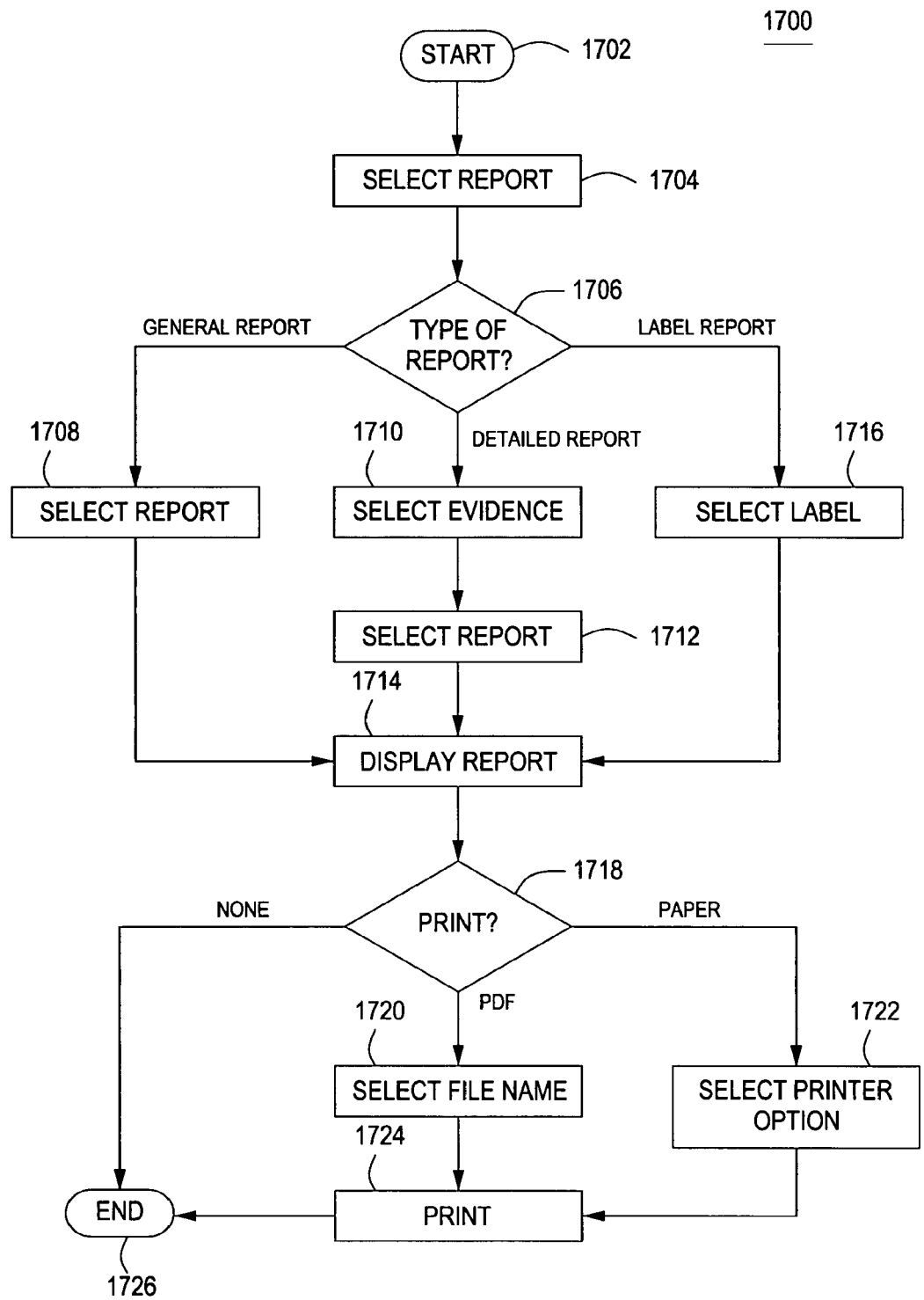
FIG. 17 is a flow diagram depicting an exemplary embodiment of a method for displaying and/or generating reports from a digital evidence system.

FIG. 17 is a flow diagram depicting an exemplary embodiment of a method 1700 for displaying and/or generating reports from a digital evidence system. The method 1700 starts with step 1702, upon the operator selecting the report tab 522 (see FIG. 5). Selecting the report tab 522 causes the report interface screen (see FIG. 18) to display on a computer monitor. At step 1704, the operator utilized the report interface screen to select a report type. Then, the method 1700 proceeds to a query at step 1706. The operator selects the report to generate. The operator can choose the general report (incoming items, timeline, deliverables, expenditures or chain of custody) at step 1708. Instead, if the operator selects the detailed report, before selecting the type report, the operator must select the evidence, step 1710. Next, at step 1712, the operator selects the type of detailed report. At last, the operator can select to print label and selects the type of label, at step 1716. When the operator selects the report, it will be displayed on the interface, step 1714 of method 1700. At step 1718, the operator selects how to print report. If the operator wants to generate a PDF, the method 1700 proceeds to step 1720 and allow the operator to selects the PDF's filename. Else, if the operator wants to print the report, the method 1700 proceeds to step 1722, wherein the operator may choose the printer option. From step 1720 and step 1722, the method 1700 proceeds to step 1724, wherein the selected item is printed. The method ends at the step 1726.

Figure 18:
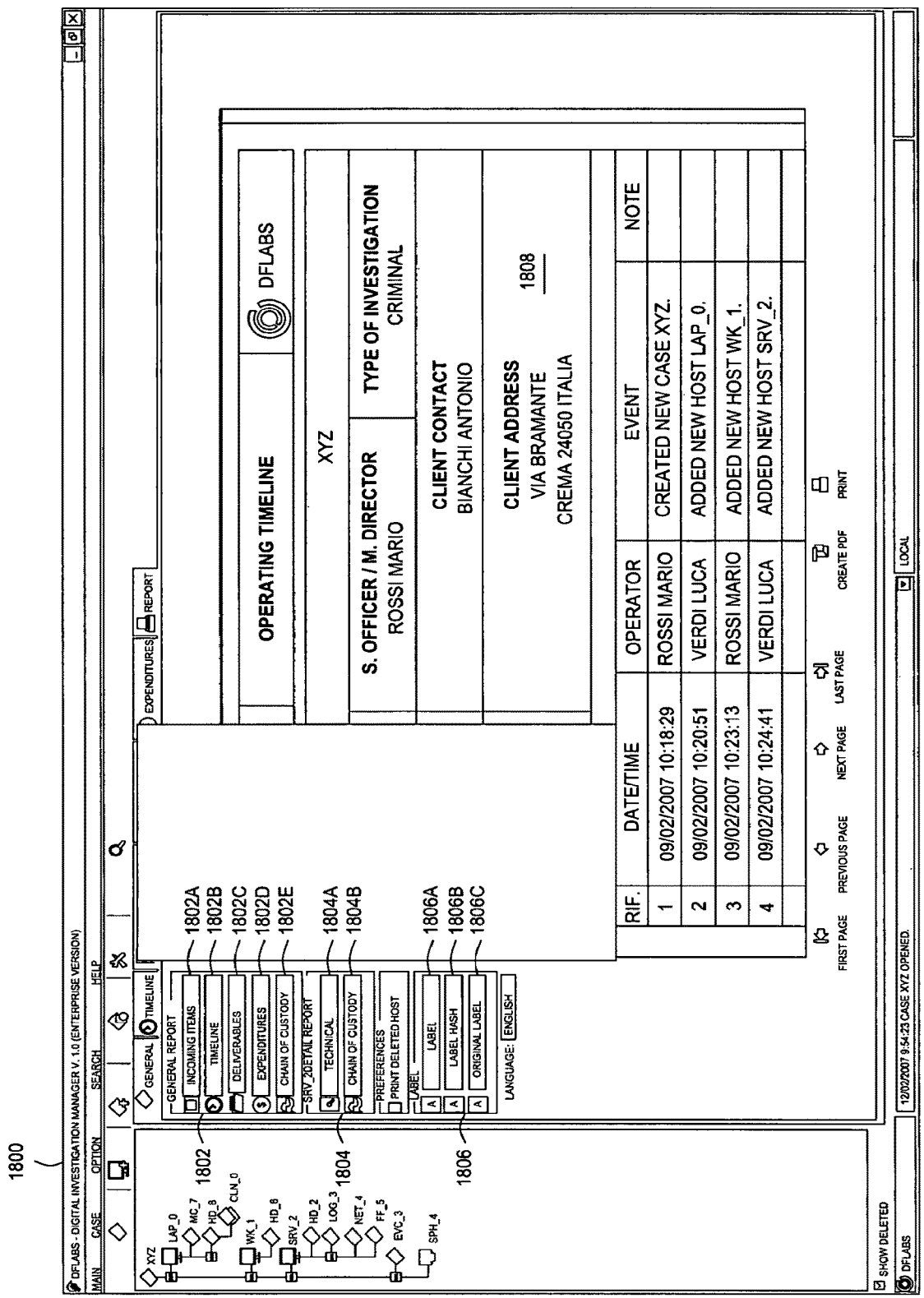
FIG. 18 is an illustration of an exemplary automatic report generation interface screen of a digital evidence system.

FIG. 18 is an illustration of an exemplary automatic report generation interface screen 1800 of a digital evidence system in accordance with one or more embodiments of the invention. The automatic report generation interface screen 1800 comprises a general report section 1802, a detail report section 1804 and a label report section 1806. The general report section 1802 generates reports by selecting a respective button, such as, the incoming items 1802a, the timeline button 1802b, the deliverable button 1802c, the expenditures button 1802d and the chain of custody button 1802e. The detail report section 1804 generates and displays the detailed report corresponding to the selected button. The label report section 1806 generates and displays the label report corresponding to the selected button, such as, the label button 1806a, the label hash button 1806b and the original label button 1806c. For example, a detailed technical report is generated and displayed by selecting a "technical" button 1804a, a chain of custody is generated by selecting the "chain of custody" button 1804b, and the like. In window 1808, a report corresponding to a selected button is displayed to the operator.

Figure 19:
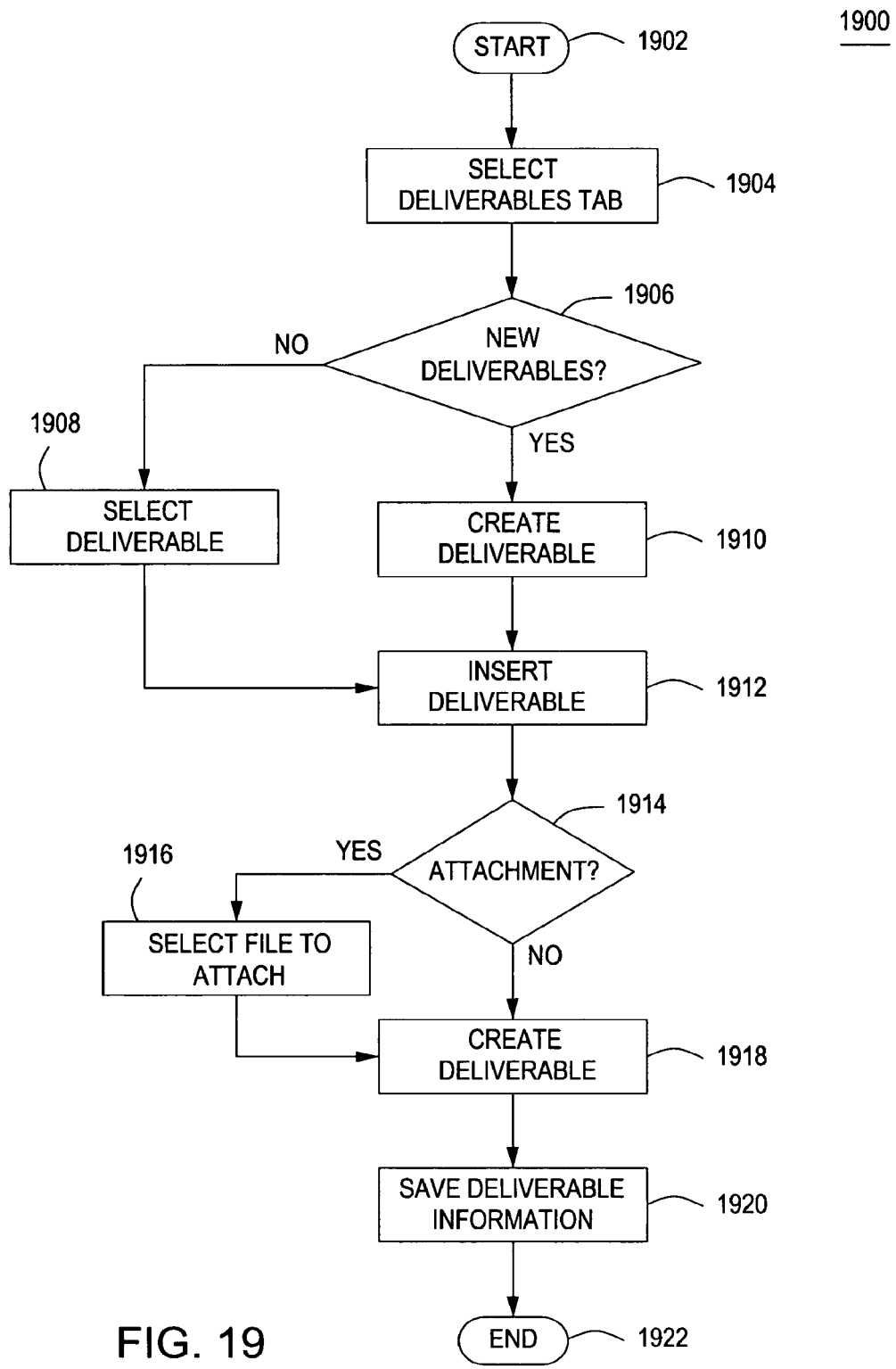
FIG. 19 is a flow diagram depicting an exemplary embodiment of a method for entering deliverables into a digital evidence system.

FIG. 19 is a flow diagram depicting an exemplary embodiment of a method 1900 for entering/updating a deliverable into a digital evidence system in accordance with one or more embodiments of the invention. The flow diagram 1900 starts with step 1902, upon the operator selecting the deliverables tab 518 (see FIG. 5). The, the method 1900 proceeds to query at step 1906. If the operator wants to edit any information about a deliverables that is stored into the digital evidence system, the method 1900 proceeds from step 1906 to step 1908. At step 1908, the operator selects the deliverable that the operator wants to edit. If the operator, instead, wants to insert a new deliverable, the method 1900 proceeds to step 1910, wherein the operator creates a new deliverable. In step 1912, the operator inserts the deliverable information. At step 1914, if the operator wants to attach a file related to deliverable, the method 1900 proceeds to step 1916 and the operator selects the file for attachment. At step 1920, the method 1900 saves deliverable information. The method 1900 ends at the step 1922.

Figure 20:
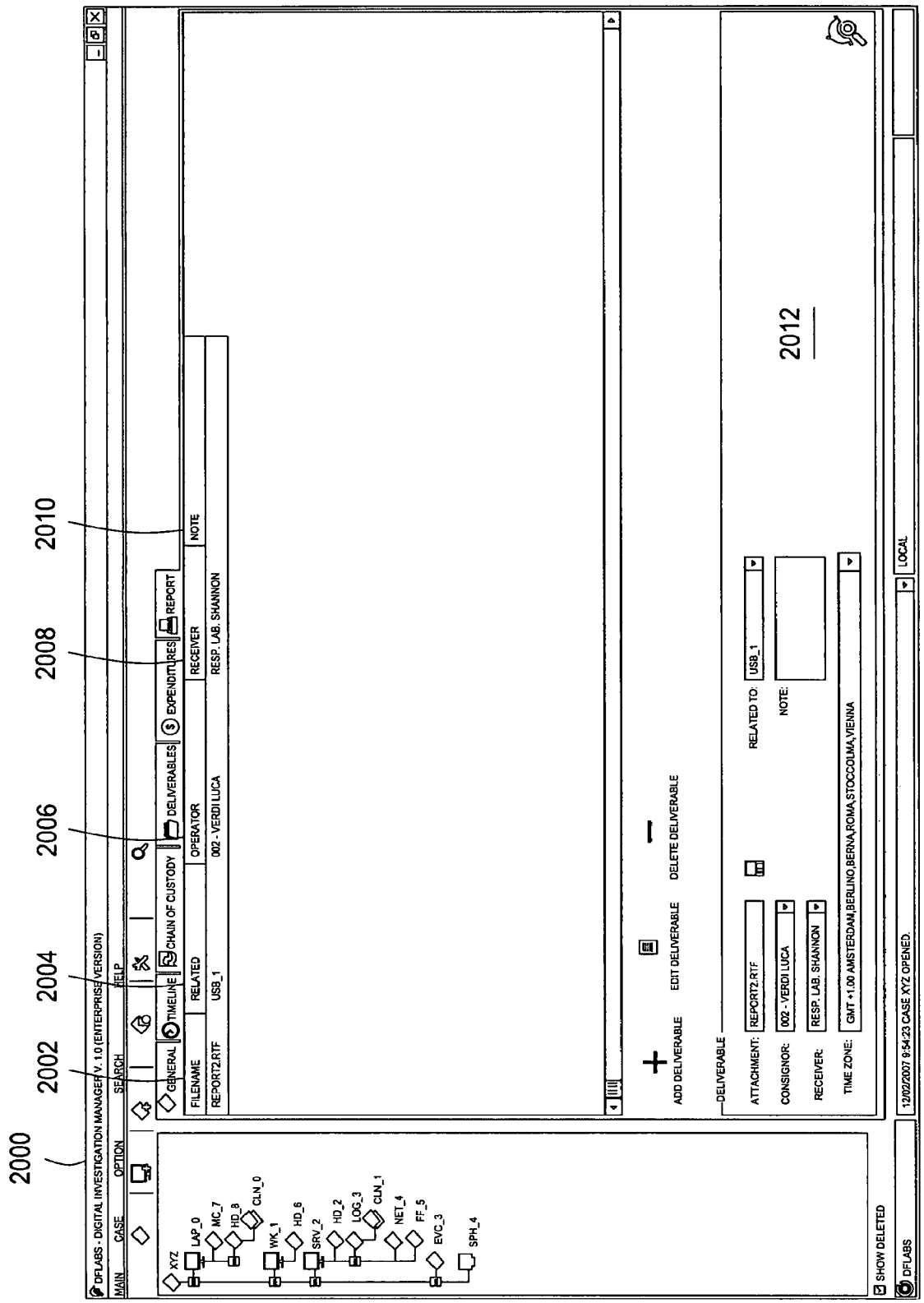
FIG. 20 is an illustration of an exemplary deliverable interface screen of a digital evidence system.

FIG. 20 is an illustration of an exemplary deliverables interface 2000 of a digital evidence control system. FIG. 20 shows the deliverables interface screen 2000 is displayed upon the operator selecting the deliverables tab 518. The deliverables interface screen 2000 includes evidence data field, such as, filename information field 2002, the evidence whom is related field 2004, consignor information field 2006, receiver information field 2008 and note information field 2010. The information defines who provided the evidence, who received the evidence and what evidence was used for once received. In addition, a new event section 2012 is available for an administrator to deliverable information.

Figure 21:
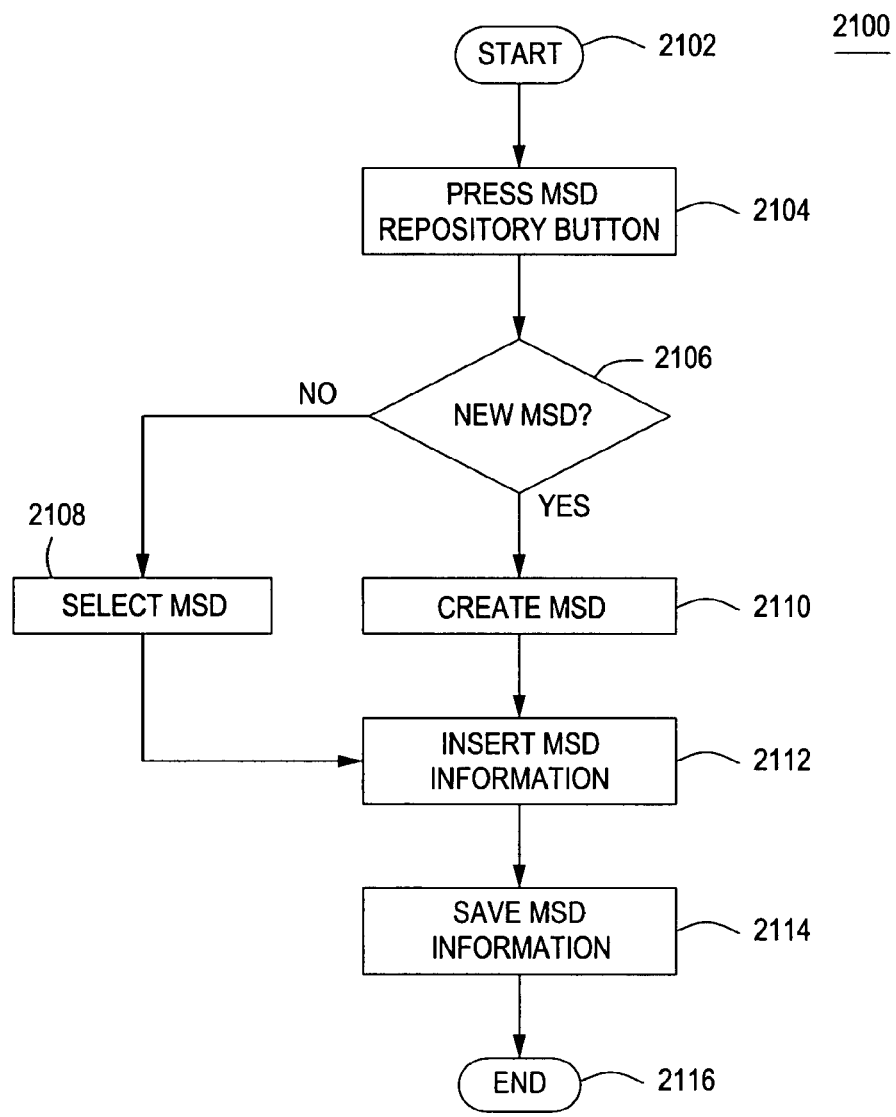
FIG. 21 is a flow diagram depicting an exemplary embodiment of a method for entering MSD (Mass Storage Device) as evidence into a digital evidence system.

FIG. 21 is a flow diagram depicting an exemplary embodiment of a method 2100 for entering/updating a MSD (Mass Storage Device) as a piece of evidence into a digital evidence system in accordance with one or more embodiments of the invention. The flow diagram 2100 starts with step 2102, upon the operator selecting the MSD button (METTERE RIFERIMENTO) (see FIG. 5). Then, the method 2100 proceeds to query at step 2106. If the operator wants to edit any information about a MSD that is stored in the digital evidence system, the method 2100 proceeds from step 2106 to step 2108. At step 2108, the operator selects the MSD to edit. If the operator, instead, wants to insert a new MSD, the method 2100 proceeds to step 2110, wherein the operator creates a new MSD. Then, in step 2112, the operator inserts the MSD information. At step 2114, the method 2100 saves MSD information. The method 2100 ends at the step 2116.

Figure 22:
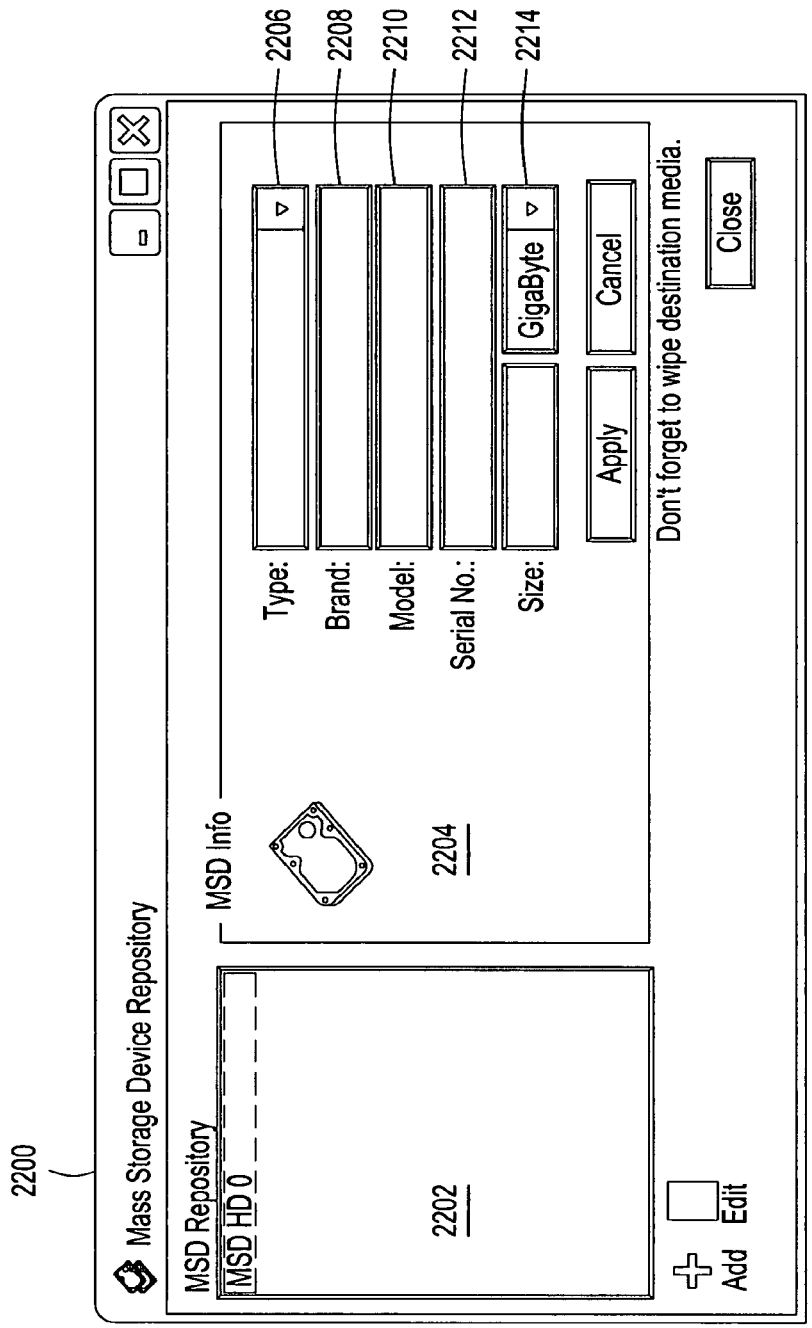
FIG. 22 is an illustration of an exemplary MSD entry interface screen of a digital evidence system.

FIG. 22 is an illustration of an exemplary MSD interface 2200 of a digital evidence control system. FIG. 22 shows the MSD interface screen 2200 is displayed upon the operator selecting the MSD button 528. The MSD interface screen 2200 includes two parts, in the left part 2202 is displayed a list of MSD that were associated with the case, and in the right part 2204, is displayed the information about the selected MSD, such as, type field 2206, brand field 2208, model field 2210, serial number field 2212 and size field 2214.

Figure 23:
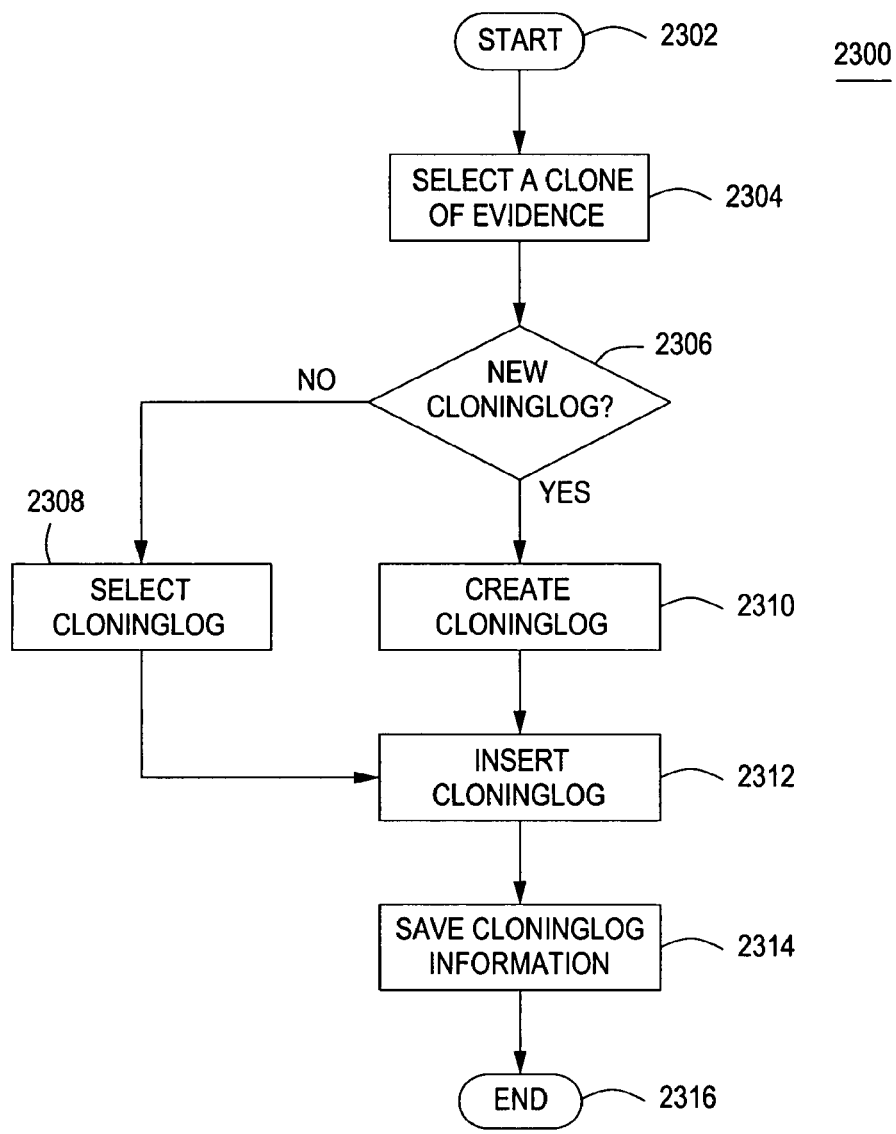
FIG. 23 is a flow diagram depicting an exemplary embodiment of a method for entering a cloning log into digital evidence system.

FIG. 23 is a flow diagram depicting an exemplary embodiment of a method 2300 for entering/updating a CloningLog into a digital evidence system in accordance with one or more embodiments of the invention. The flow diagram 2300 starts with step 2302, upon which the operator selecting the CloningLog button (METTERE RIFERIMENTO) (see FIG. 5). Next, at step 2304, the operator must select a clone of evidence. Then, the method 2300 proceeds to query at step 2306. If the operator wants to edit any information about a CloningLog that is stored in the digital evidence system, the method 2300 proceeds from step 2306 to step 2308. At step 2308, the operator selects the CloningLog to edit. If the operator, instead, wants to insert a new CloningLog, the method 2300 proceeds to step 2310, wherein the operator creates a new CloningLog. Then, in step 2312, the operator inserts the CloningLog information. At step 2314, the method 2300 saves CloningLog information. The method 2300 ends at the step 2316.

Figure 24:
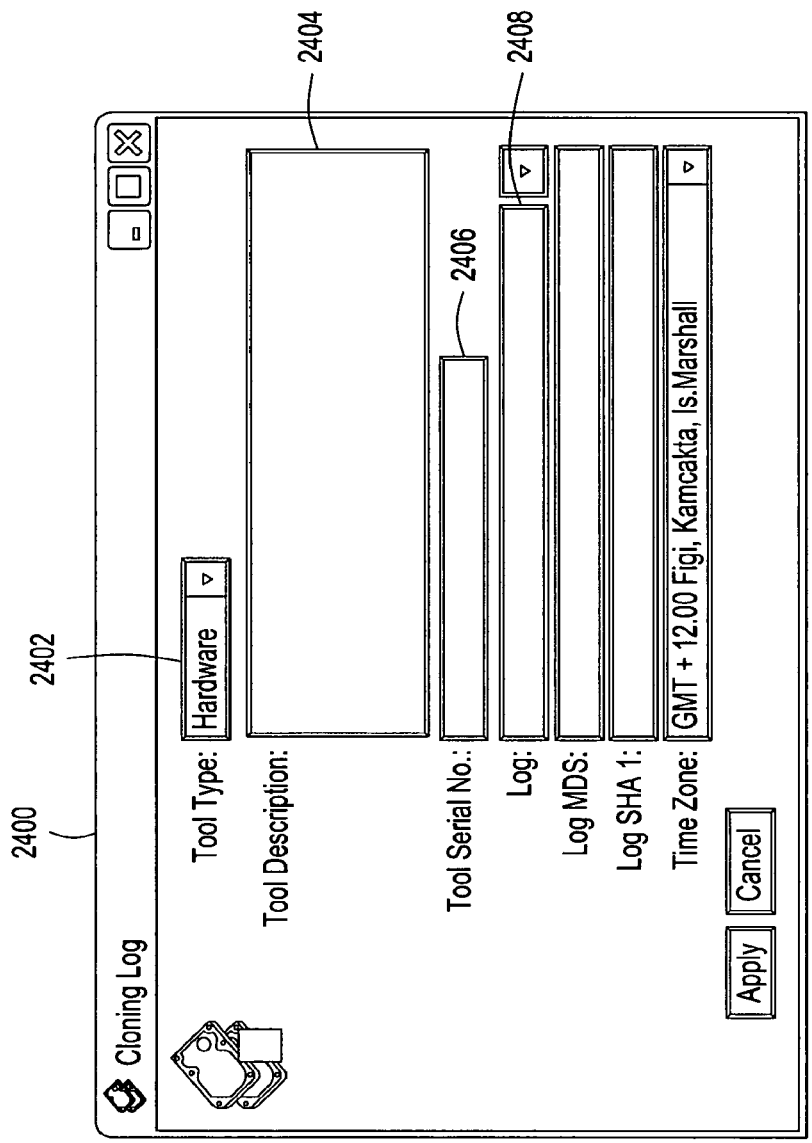
FIG. 24 is an illustration of an exemplary cloning log entry interface screen of a digital evidence system.

FIG. 24 is an illustration of an exemplary CloningLog interface 2400 of a digital evidence control system. FIG. 24 shows the CloningLog interface screen 2400 is displayed upon the operator selecting the CloningLog button (METTERE RIFERIMENTO). The CloningLog interface screen 2400 display fields, such as, tool type field 2402, tool description field 2404, tool serial number field 2406, log field 2408, and the like.

Figure 25:
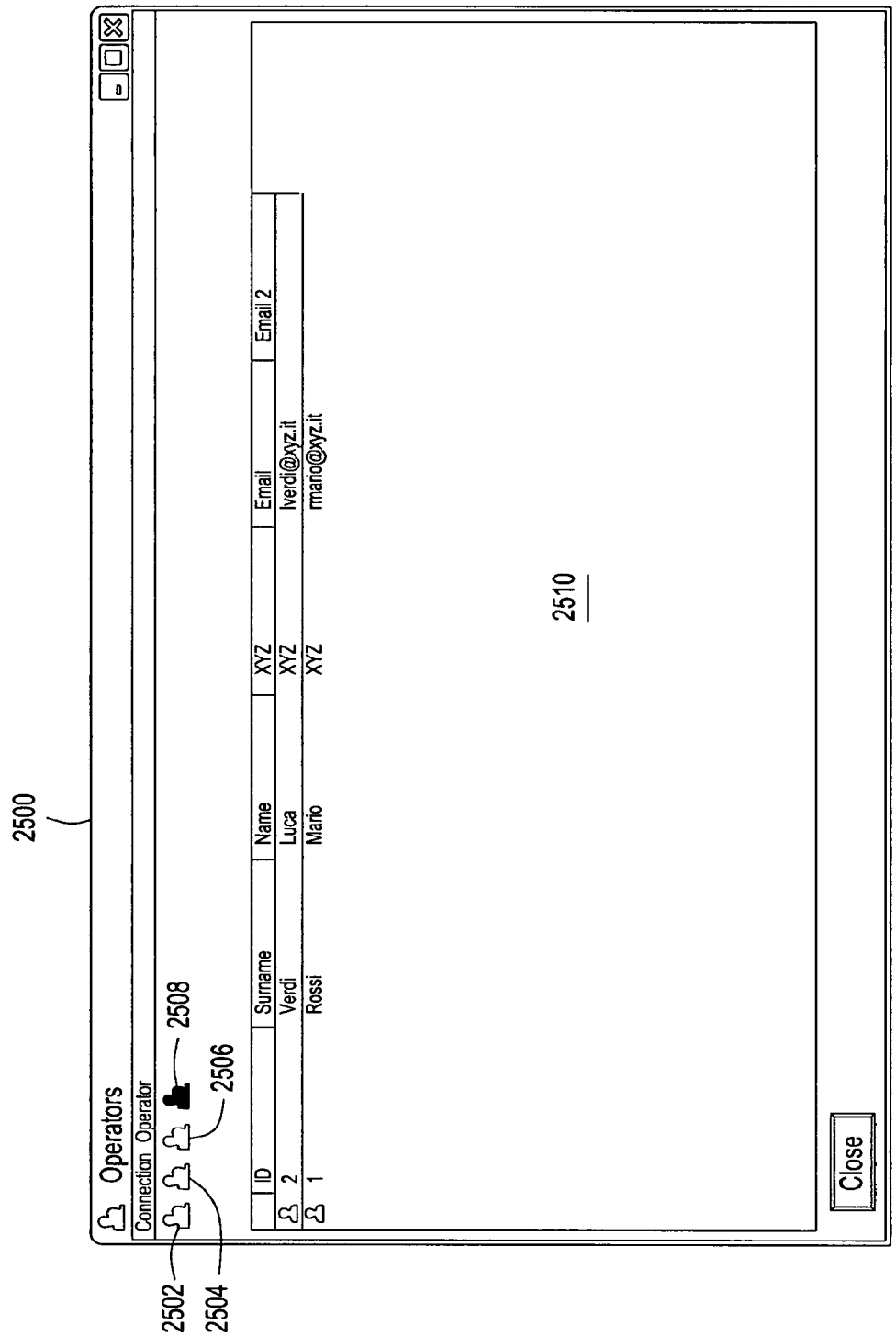
FIG. 25 is an illustration of an exemplary operator management interface screen of a digital evidence system.

FIG. 25 is an illustration of an exemplary Operator Management interface 2500 of a digital evidence control system. FIG. 25 shows the Operator Management interlace screen 2500 that is displayed upon the operator selecting the Operator Management button menu (METTERE RIFERIMENTO). The Operator Management interface screen 2500 display the button that allow the operator to add a new operator 2502, edit an operator 2504, delete an operator 2506 and disable an operator 2508. In the bottom of Operator Management interface screen 2500 is displayed the list of operators 2510 that is been store into the digital evidence system.

Figure 26:
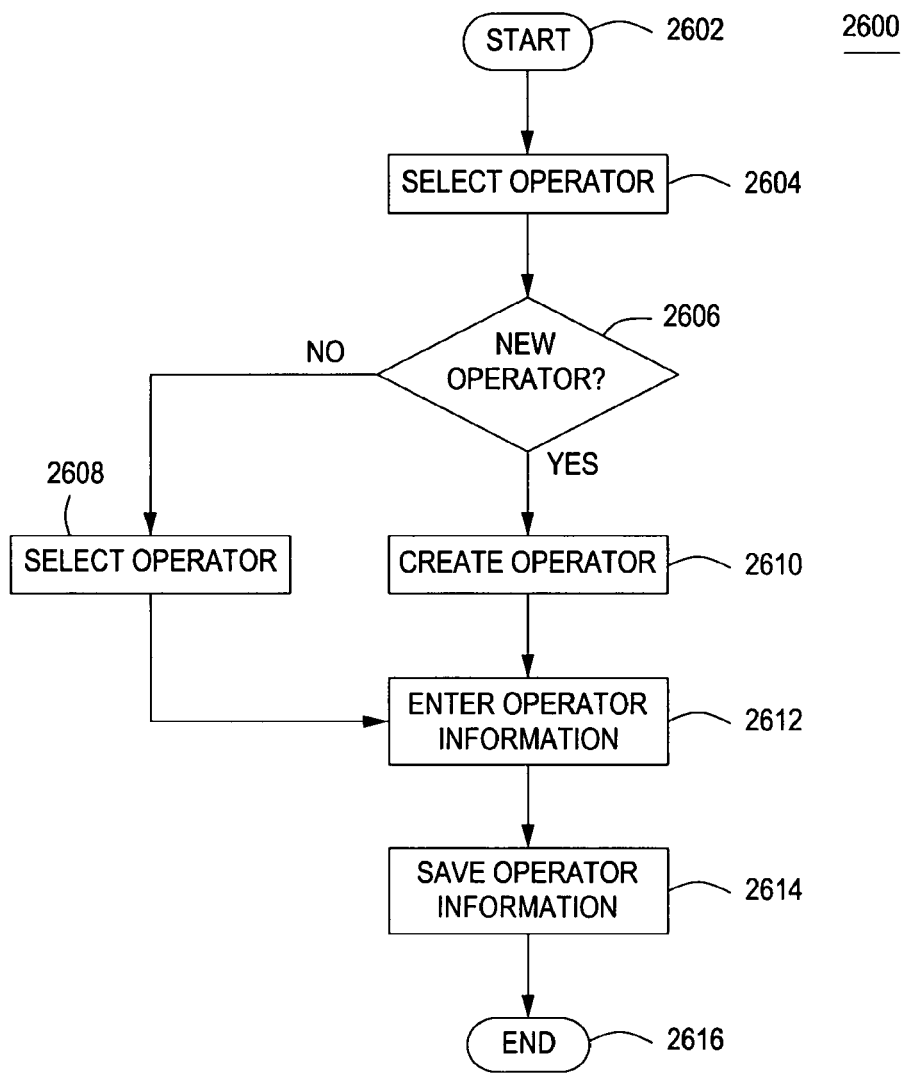
FIG. 26 is a flow diagram depicting an exemplary embodiment of a method for entering operator information into a digital evidence system.

FIG. 26 is a flow diagram depicting an exemplary embodiment of a method 2600 for entering/updating an operator into a digital evidence system in accordance with one or more embodiments of the invention. The flow diagram 2600 starts with step 2602, upon the operator selecting the Operator Manager button 2604 (METTERE RIFERIMENTO) (see FIG. 26). Then, the method 2600 proceeds to query at step 2606. If the operator wants to edit any information about an operator that is stored in the digital evidence system, the method 2600 proceeds from step 2606 to step 2608. At step 2608, the operator selects the operator that wants to edit. If the operator, instead, wants to insert a new operator, the method 2600 proceeds at step 2610, wherein the operator creates a new operator file. Then, in step 2612, the operator inserts the operator information. At step 2614, the method 2600 saves operator information. The method 2600 ends at the step 2616.

Figure 27:
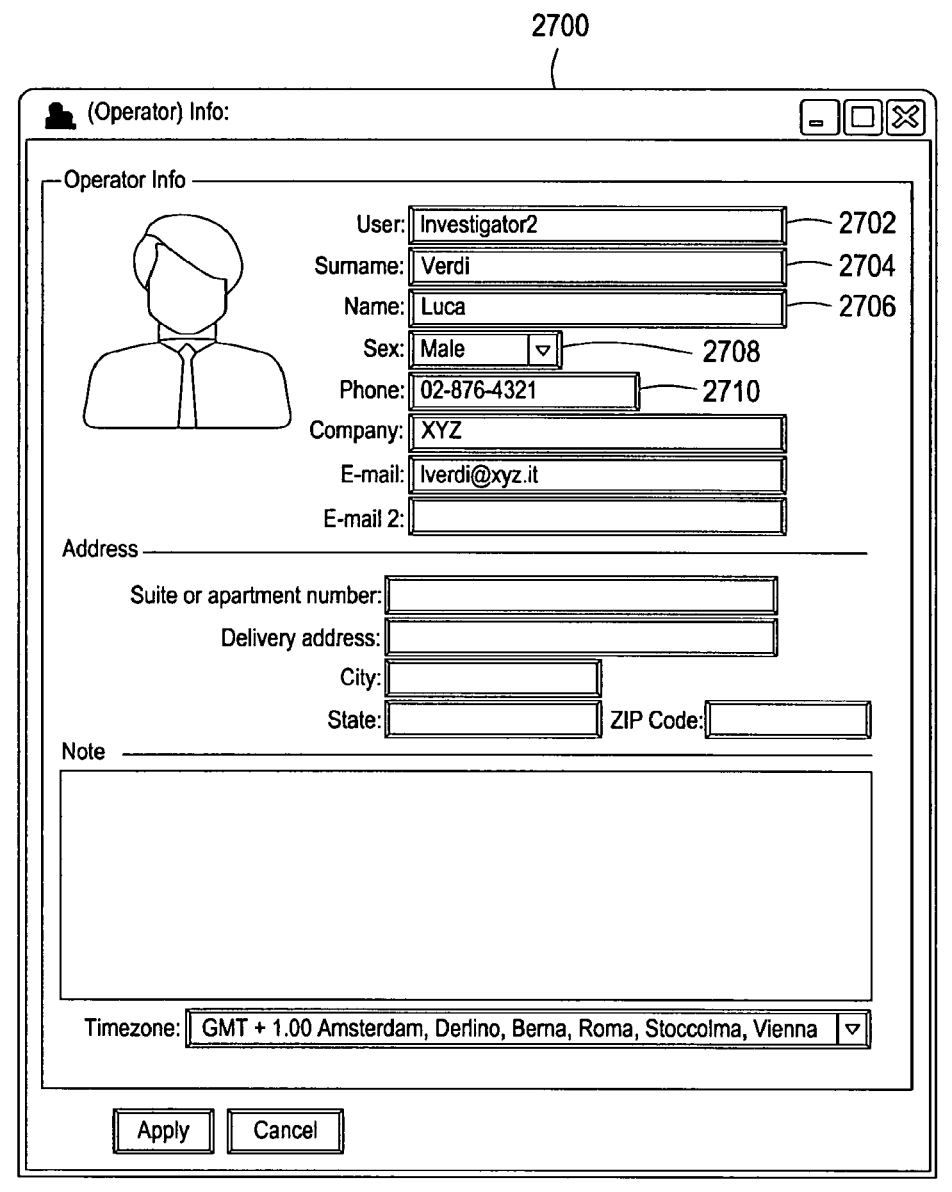

FIG. 27 is an illustration of an exemplary Operator interface 2700 of a digital evidence control system. FIG. 27 shows the operator interlace screen 2700 is displayed upon the operator selecting the Operator button 2502 or double click on the operator button. The operator interlace screen 2700 display fields, such as, username field 2702, surname field 2704, name field 2706, sex field 2708, phone field 2710, and the like.

Figure 28:
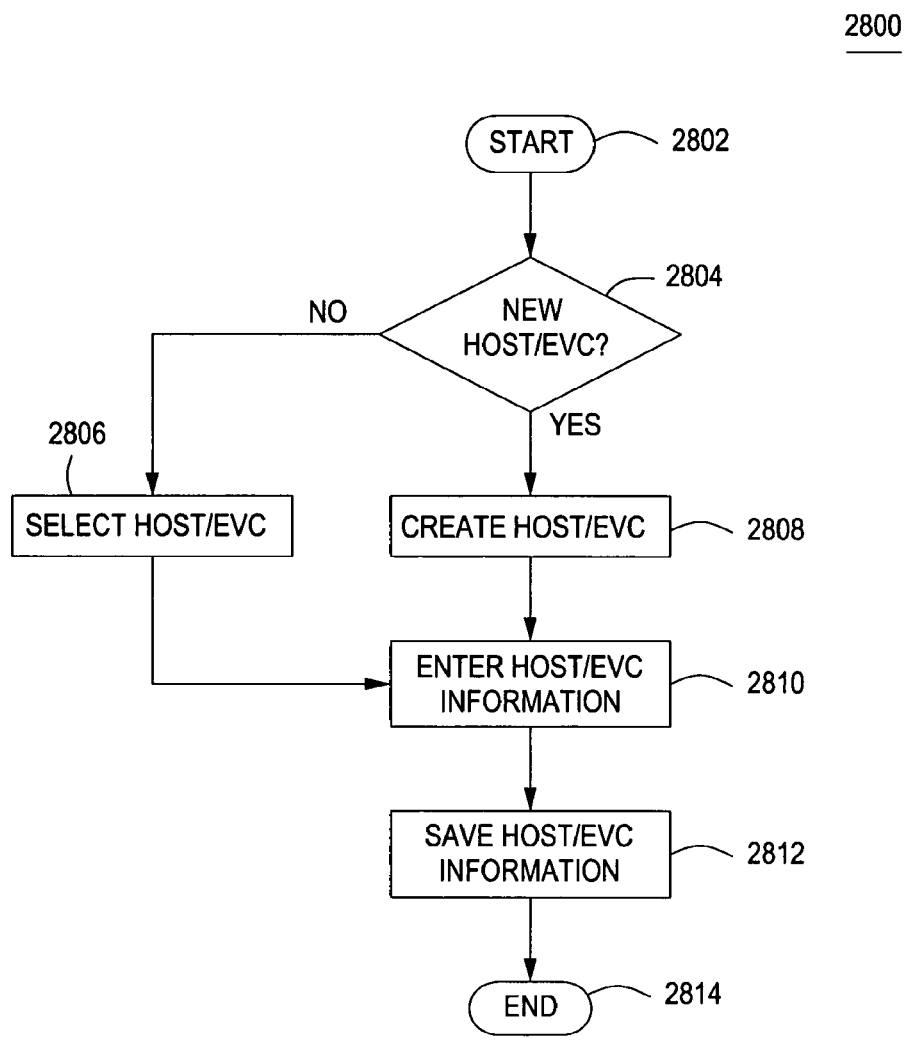
FIG. 28 is a flow diagram depicting an exemplary embodiment of a method for entering a host or an evidence collector into a digital evidence system.

FIG. 28 is a flow diagram depicting an exemplary embodiment of a method 2800 for entering/updating a host or an evidence collector into a digital evidence system in accordance with one or more embodiments of the invention. The method 2800 begins at step 2802 and proceeds to query at step 2804. If the operator wants to edit any information about an host or an evidence collector that is been store into the digital evidence system, the method 2800 proceeds from step 2804 to step 2806. At step 2806, the operator selects the host or the evidence collector that wants to edit. If the operator, instead, wants to insert a new host or evidence collector, the method 2800 proceeds at step 2808. Then, in step 2810, the operator inserts the host or evidence collector information. At step 2812, the method 2800 saves operator information. The method 2800 ends at the step 2814.

Figure 29:
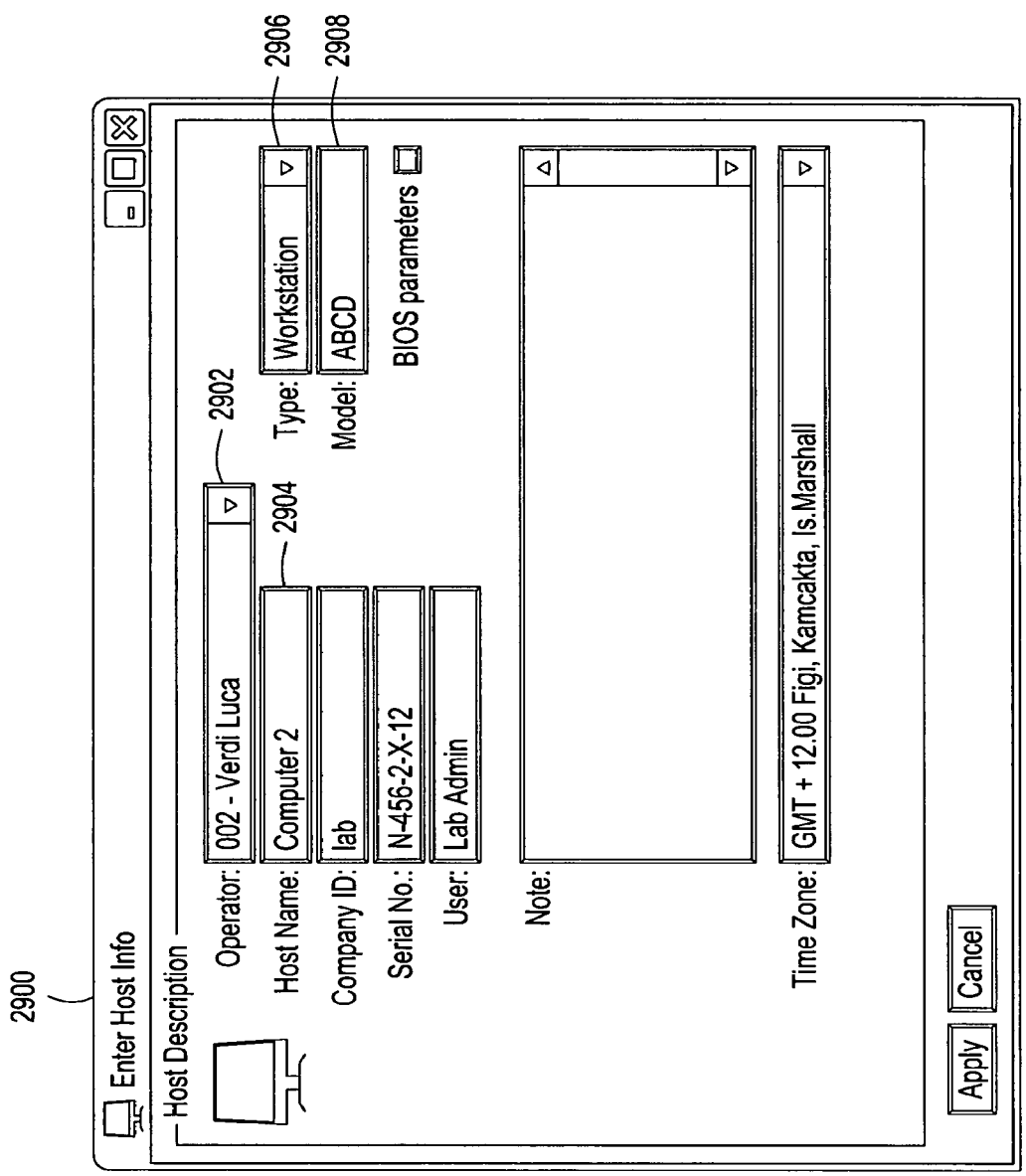
FIG. 29 is an illustration of an exemplary host input information interface screen of a digital evidence system.

FIG. 29 is an illustration of an exemplary Host interface 2900 of a digital evidence control system. FIG. 29 shows the host interface screen 2900 is displayed upon the operator selecting the new host button 532 or edit host information button 606. The host interface screen 2900 display fields, such as, operator that inserts the information 2902, host name 2904, type of host 2906, Company ID 2908, and the like.

Figure 30:
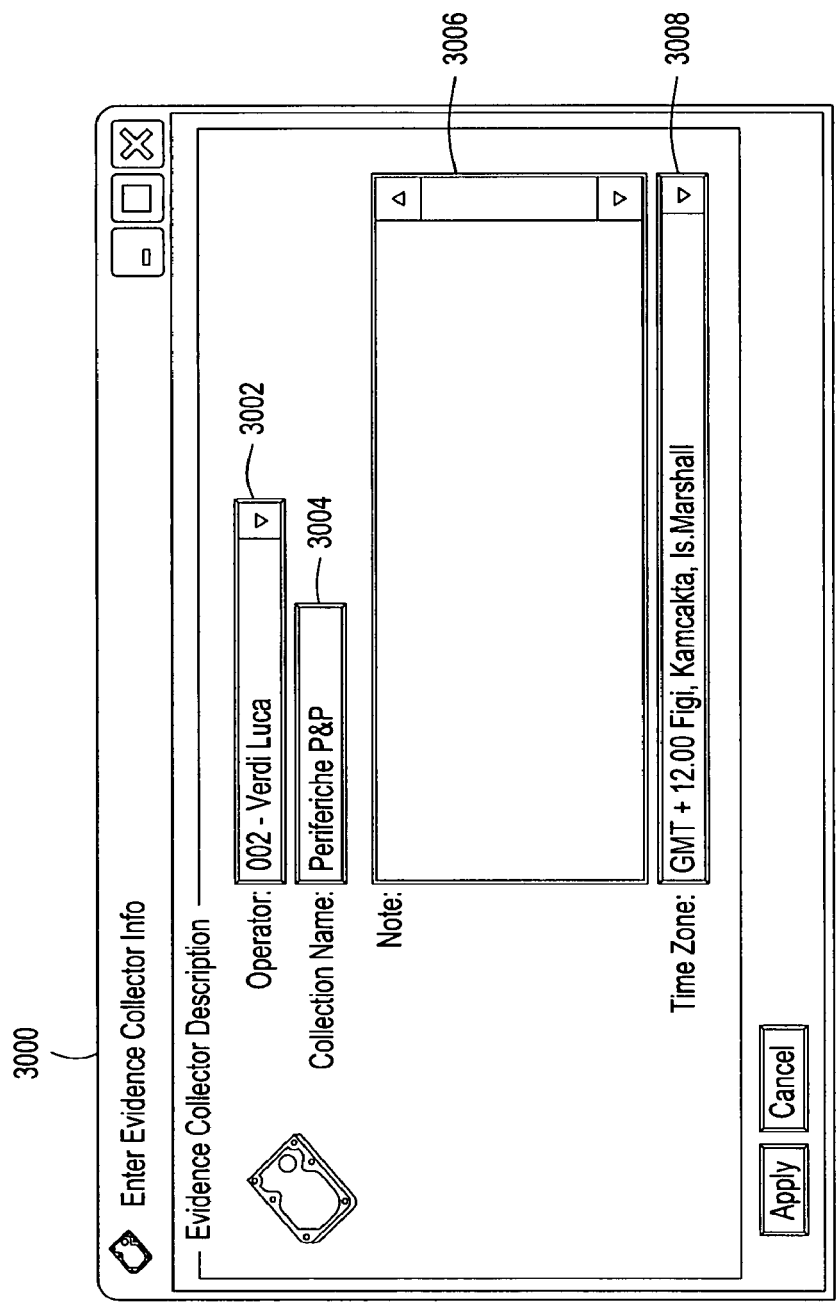
FIG. 30 is an illustration of an exemplary evidence collector input information interface screen of a digital evidence system.

FIG. 30 is an illustration of an exemplary Evidence Collector interface 3000 of a digital evidence control system. FIG. 30 shows the evidence collector interface screen 3000 is displayed upon the operator selecting the new evidence collector button 534 or edit evidence collector information button 3406. The evidence collector interface screen 3000 display fields, such as, operator that inserts the information 3002, evidence collector name 3004, note 3006 and time zone 3008

Figure 31:
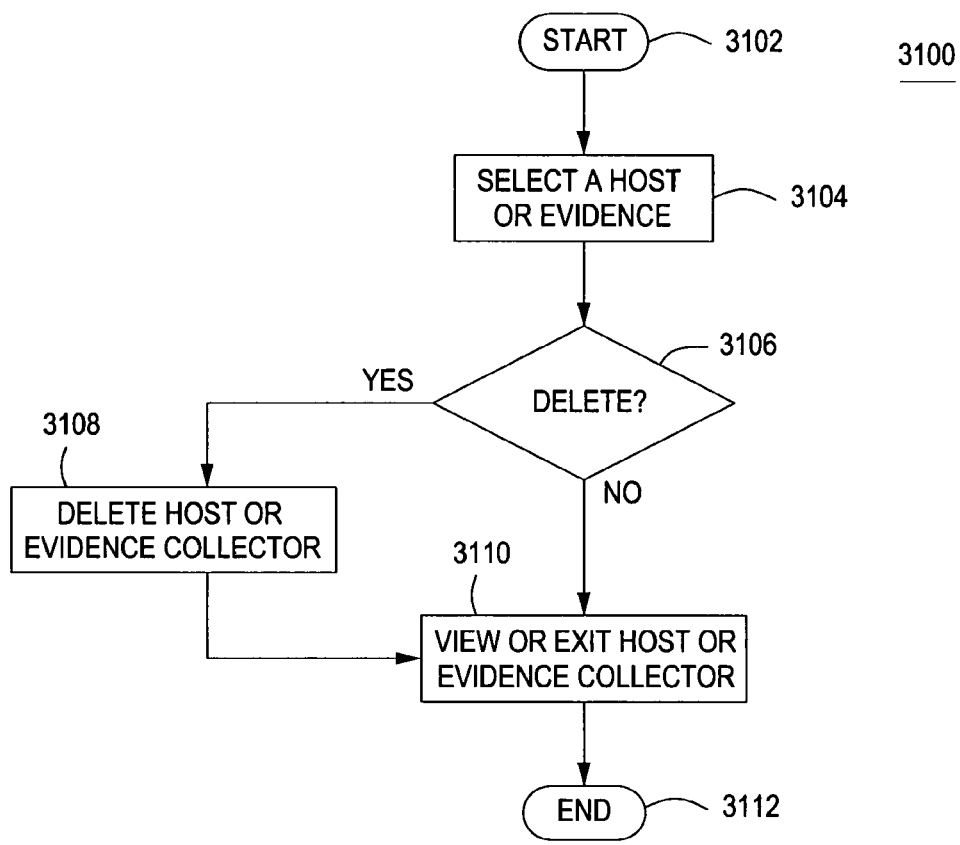
FIG. 31 is a flow diagram depicting an exemplary embodiment of a method for deleting a host or an evidence collector into a digital evidence system.

FIG. 31 is a flow diagram depicting an exemplary embodiment of a method 3100 for deleting a host or an evidence collector into a digital evidence system in accordance with one or more embodiments of the invention. The method 3100 start at step 3102 and, at step 3104, the operator selected a host or an evidence collector that will be deleted. Then, the method 3100 proceeds to query at step

3106. If the operator wants to delete any information about an host or an evidence collector that is stored into the digital evidence system, the method 3000 proceeds from step 3106 to step 3108. At step 3108, the method deletes the information about the host or evidence collector. If the operator, instead, doesn't want to delete a host or an evidence collector, the method 3100 proceeds to step 3110, wherein the operator can view or exit the host or evidence collector. The method 3100 ends at the step 3112.

Figure 32:
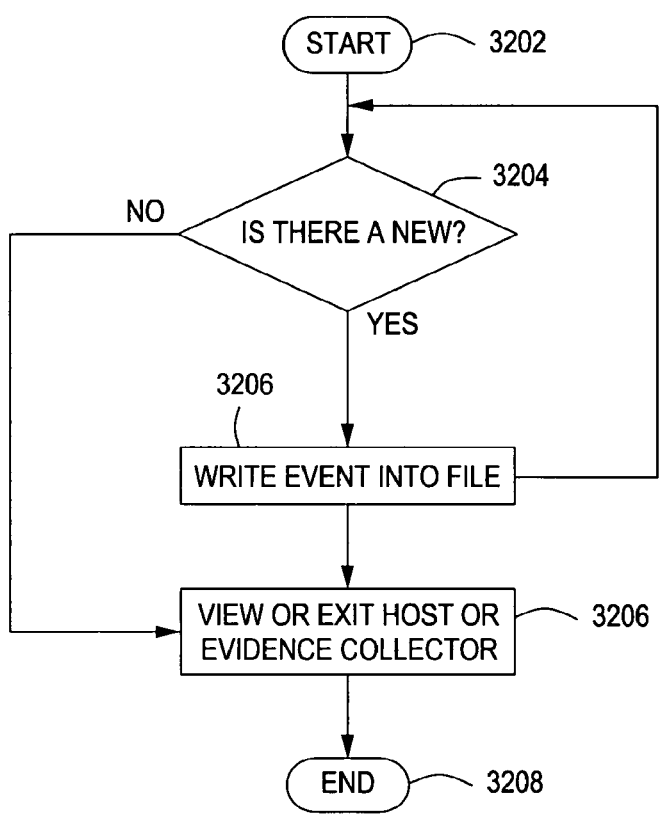
FIG. 32 is a flow diagram depicting an exemplary embodiment of a method for entering event log into a digital evidence system.

FIG. 32 is a flow diagram depicting an exemplary embodiment of a method 3200 for entering event into log file into a digital evidence system in accordance with one or more embodiments of the invention. The method 3200 start at step 3202 and, at step 3204, the method waits the generation of a new log event. Next, at step 3206, the method 3200 write into log file the log event and return at step 3204 to wait another one. If there is not an event, at step 3206, the operator can view or exit the host or evidence collector. The method ends at step 3208.

FIGS. 33A and 33B are an exemplary log file created by the digital evidence system in accordance with one or more embodiments of the invention. The first section display date information 3302 and the second section display a summary description of event 3304.

Figure 34:
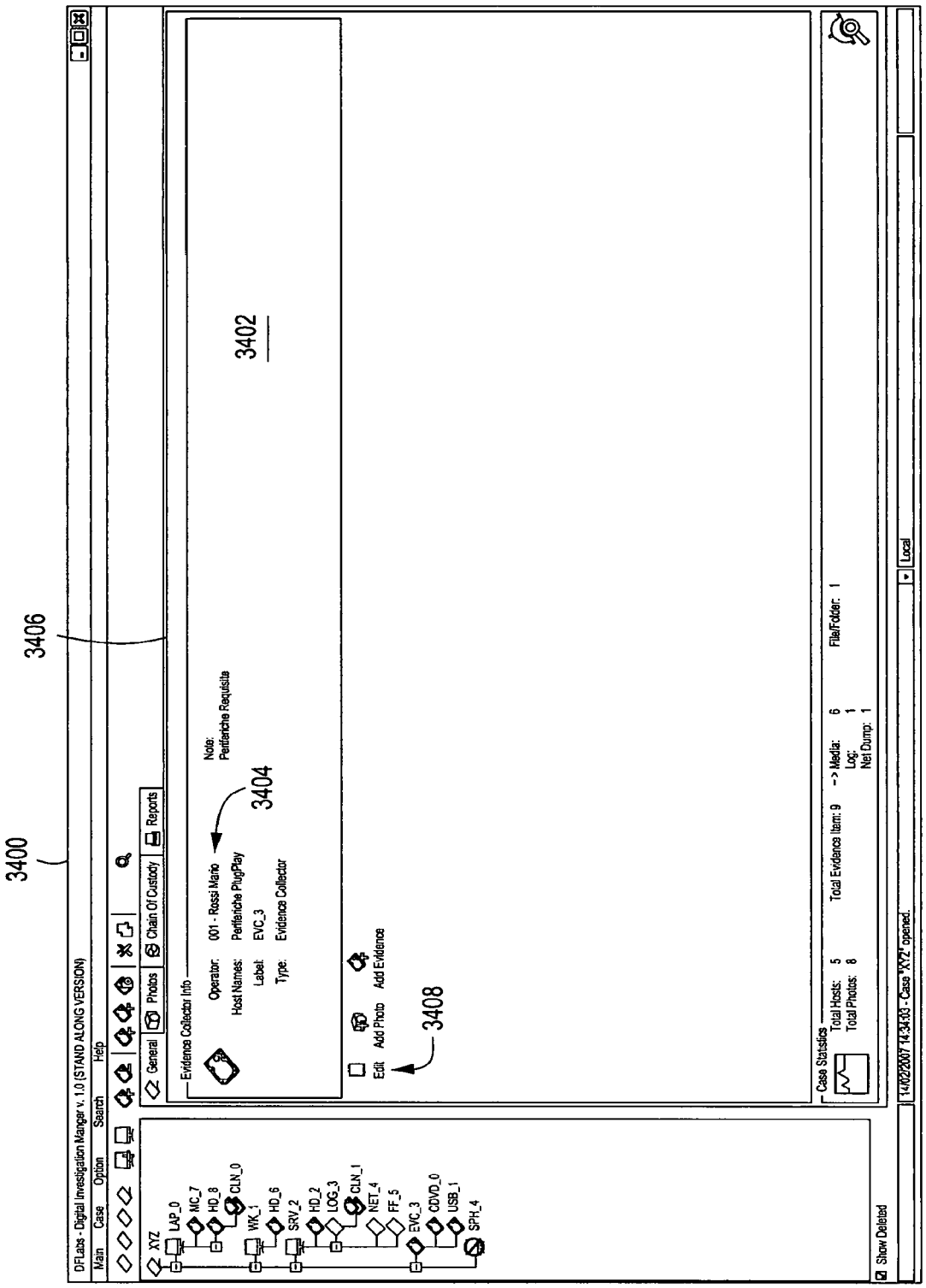
FIG. 34 is an illustration of an exemplary evidence information screen of a digital evidence system.

FIG. 34 is an illustration of an exemplary evidence collector information interface screen 3400 of a digital evidence control system. Once a case is created and evidence collector is inserted, evidence collector information can be displayed in the evidence collector information interface screen 3400. The evidence collector information window 3402 includes the evidence collector name 3404, note 3406, and the like. For editing evidence collector information the operator can use edit button 3408.

While the foregoing is directed to embodiments of the present invention, other and further embodiments of the invention may be devised without departing from the basic scope thereof, and the scope thereof is determined by the claims that follow.

What is claimed is:

1. A computer-implemented method of authenticating digital evidence and establishing a chain of custody of the digital evidence, comprising:
   operating a computer-implemented digital evidence control system that allows access to digital evidence stored in a plurality of hosts without interfering with authenticity of the digital evidence and that provides a process for maintaining a chain of custody of the digital evidence;
   establishing and maintaining authenticity of at least one piece of digital evidence due to the digital evidence control system allowing access to the at least one piece of digital evidence without interfering with the authenticity of the at least one piece of digital evidence; and
   establishing and maintaining a chain of custody of the at least one piece of digital evidence due to the digital evidence control system providing a process for maintaining the chain of custody of the at least one piece of digital evidence;
   the computer-implemented method comprising creating, on a computer executing the digital evidence control system, a case record comprising information about an investigative case, generating, using the computer, a cryptographic hash of the at least one piece of digital evidence, by creating a clone of the at least one piece of digital evidence and generating, using the computer, a cryptographic hash of the clone, and associating the cryptographic hash with the case record so that the at least one piece of digital evidence can be accessed without interfering with authenticity of the digital evidence, and creating a chain of custody within the case record using a chain of custody interface screen of the digital evidence control system, the chain of custody including identification of entities that have interacted with the at least one piece of digital evidence;
   the computer-implemented method further comprising displaying
      a case information interface screen displaying the information from the case record about the investigative case,
      a host information interface screen having a host information window and an evidence list window, the host information window identifying one of the plurality of hosts, on which the at least one piece of digital evidence is stored, the evidence list window identifying items of digital evidence stored on the host including the at least one piece of digital evidence,
      an evidence information interface screen having an evidence information window identifying the at least one piece of digital evidence and a clone information window listing the clone created from the at least one piece of digital evidence and identifying a storage location of the clone and identifying the cryptographic hash of the clone to thereby associate the cryptographic hash with the case record so that the at least one piece of digital evidence can be accessed without interfering with authenticity of the digital evidence, and
      the chain of custody interface screen, the chain of custody interface screen identifying the at least one piece of digital evidence and the host on which the at least one piece of digital evidence is stored and the identification of the entities that have interacted with the at least one piece of digital evidence,
      wherein, upon an entity accessing and interacting with the piece of digital evidence, the chain of custody interfaces screen identifies the entity, and the cryptographic hash displayed in the clone information window of the evidence information interface screen is altered if the entity has tampered with the piece of digital evidence but remains unaltered if the entity has not tampered with the piece of digital evidence.

2. The method of claim 1 wherein the cryptographic hash of the clone is an MD5 hash.

3. The method of claim 1 wherein the case record is created in a relational database.

4. The method of claim 1 further comprising creating an image of the at least one piece of digital evidence.

5. The method of claim 1 further comprising establishing roles for each person in a plurality of persons that are able to access the case record, where each role defines a level of access.

6. The method of claim 1 further comprising creating a unique identifier for the at least one piece of digital evidence.

7. The method of claim 1 further comprising uploading photographic evidence to the case record.

8. The method of claim 1 further comprising creating a timeline within the case record comprising a sequence of events that occurred during an investigation involving the at least one piece of digital evidence.

9. The method of claim 1 wherein the step of creating a chain of custody within the case record comprises identification of persons that have accessed the case record.

10. The method of claim 1 further comprising storing cost information in the case record using a cost involved interface screen of the digital evidence control system.

11. The method of claim 1 further comprising selectably creating at least one report regarding the case record.

12. Apparatus for authenticating digital evidence and establishing a chain of custody of the digital evidence, comprising:
- a computer executing a digital evidence control system that allows access to digital evidence stored in a plurality of hosts without interfering with authenticity of the digital evidence and that provides a process for maintaining a chain of custody of the digital evidence, to enable establishing and maintaining of the authenticity of at least one piece of digital evidence, and to enable establishing and maintaining of the chain of custody of the at least one piece of digital evidence;
- a memory, coupled to the computer, for storing within a database a case record, established by the digital evidence control system, comprising information about an investigative case; and
- at least one client workstation, coupled to the computer, for allowing access to the at least one piece of digital evidence without interfering with authenticity of the digital evidence,
- wherein the case record comprises case information entered using an evidence information interface screen of the digital evidence control system, a chain of custody entered using a chain of custody interface of the digital evidence control system, the chain of custody including identification of entities that have interacted with the at least one piece of digital evidence, and a cryptographic hash of the at least one piece of digital evidence, generated by creating a clone of the at least one piece of digital evidence and generating, using the computer, the cryptographic hash of the clone, so that the at least one piece of digital evidence can be accessed without interfering with authenticity of the at least one piece of digital evidence;
- the digital evidence control system being programmed to display
  - a case information interface screen displaying the information from the case record about the investigative case,
  - a host information interface screen having a host information window and an evidence list window, the host information window identifying one of the plurality of hosts, on which the at least one piece of digital evidence is stored, the evidence list window identifying items of digital evidence stored on the host including the at least one piece of digital evidence,
  - an evidence information interface screen having an evidence information window identifying the at least one piece of digital evidence and a clone information window listing the clone created from the at least one piece of digital evidence and identifying a storage location of the clone and identifying the cryptographic hash of the clone to thereby associate the cryptographic hash with the case record so that the at least one piece of digital evidence can be accessed without interfering with authenticity of the digital evidence, and
  - a chain of custody interface screen identifying the at least one piece of digital evidence and the host on which the at least one piece of digital evidence is stored and the identification of the entities that have interacted with the at least one piece of digital evidence,
- wherein, upon an entity accessing and interacting with the piece of digital evidence, the chain of custody interfaces screen identifies the entity, and the cryptographic hash displayed in the clone information window of the evidence information interface screen is altered if the entity has tampered with the piece of digital evidence but remains unaltered if the entity has not tampered with the piece of digital evidence.

13. A non-transitory computer readable medium comprising software that, when executed by a processor, causes the processor to execute a digital evidence control system for allowing access to digital evidence stored in a plurality of hosts without interfering with authenticity of the digital evidence, while providing a process for maintaining a chain of custody of the digital evidence, the digital evidence control system performing a method comprising:
- creating a case record comprising information about an investigative case using a digital evidence control system;
- generating a cryptographic hash of at least one piece of digital evidence, by creating a clone of the at least one piece of digital evidence and generating, using the computer, a cryptographic hash of the clone, and associating the cryptographic hash with the case record so that the at least one piece of digital evidence can be accessed without interfering with authenticity of the at least one piece of digital evidence, so as to enable establishing and maintaining of the authenticity of the at least one piece of digital evidence; and
- creating a chain of custody within the case record using a chain of custody interface screen of the digital evidence control system, the chain of custody including identification of entities that have interacted with the at least one piece of digital evidence, so as to enable establishing and maintaining of the chain of custody of the at least one piece of digital evidence;
- the digital evidence control system being programmed to display
  - a case information interface screen displaying the information from the case record about the investigative case,
  - a host information interface screen having a host information window and an evidence list window, the host information window identifying one of the plurality of hosts, on which the at least one piece of digital evidence is stored, the evidence list window identifying items of digital evidence stored on the host including the at least one piece of digital evidence,
  - an evidence information interface screen having an evidence information window identifying the at least one piece of digital evidence and a clone information window listing the clone created from the at least one piece of digital evidence and identifying a storage location of the clone and identifying the cryptographic hash of the clone to thereby associate the cryptographic hash with the case record so that the at least one piece of digital evidence can be accessed without interfering with authenticity of the digital evidence, and
  - a chain of custody interface screen identifying the at least one piece of digital evidence and the host on which the at least one piece of digital evidence is stored and the identification of the entities that have interacted with the at least one piece of digital evidence, wherein, upon an entity accessing and interacting with the piece of digital evidence, the chain of custody interfaces screen identifies the entity, and the cryptographic hash displayed in the clone information window of the evidence information interface screen is altered if the entity has tampered with the piece of digital evidence but remains unaltered if the entity has not tampered with the piece of digital evidence.

14. The computer readable medium of claim 13 wherein the method further comprises tracking access to the case record.

\* \* \* \* \*